(12) United States Patent
Hwangbo et al.

(10) Patent No.: US 11,644,571 B2
(45) Date of Patent: May 9, 2023

(54) ELECTRONIC APPARATUS AND CONTROL METHOD THEREOF

(71) Applicant: SAMSUNG ELECTRONICS CO., LTD., Suwon-si (KR)

(72) Inventors: Minsu Hwangbo, Suwon-si (KR); Hyunseok Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 497 days.

(21) Appl. No.: 16/833,777

(22) Filed: Mar. 30, 2020

(65) Prior Publication Data

US 2021/0004567 A1 Jan. 7, 2021

(30) Foreign Application Priority Data

Jul. 1, 2019 (KR) .......................... 10-2019-0078850
Nov. 25, 2019 (KR) .......................... 10-2019-0151982

(51) Int. Cl.
*G06V 20/64* (2022.01)
*G01S 17/08* (2006.01)
*G01S 17/89* (2020.01)

(52) U.S. Cl.
CPC .............. *G06V 20/64* (2022.01); *G01S 17/08* (2013.01); *G01S 17/89* (2013.01)

(58) Field of Classification Search
None
See application file for complete search history.

(56) References Cited

U.S. PATENT DOCUMENTS

| 6,697,147 | B2 | 2/2004 | Ko et al. |
| 9,829,564 | B2 | 11/2017 | Bruder et al. |
| 11,035,956 | B2 | 6/2021 | Dagley et al. |
| 11,054,508 | B2 | 7/2021 | Li et al. |
| 2008/0205748 | A1 | 8/2008 | Lee et al. |
| 2012/0033045 | A1 | 2/2012 | Schweizer et al. |
| 2013/0226344 | A1 | 8/2013 | Wong et al. |
| 2015/0253429 | A1 | 9/2015 | Dorrington et al. |

(Continued)

FOREIGN PATENT DOCUMENTS

| JP | 2002-214361 A | 7/2002 |
| KR | 10-2004-0002162 A | 1/2004 |

(Continued)

OTHER PUBLICATIONS

International Search Report (PCT/ISA/210), dated Jul. 15, 2020 issued by International Searching Authority in corresponding International Application No. PCT/KR2020/004791.

(Continued)

*Primary Examiner* — Stuart D Bennett
(74) *Attorney, Agent, or Firm* — Sughrue Mion, PLLC

(57) ABSTRACT

An electronic apparatus includes a processor configured to identify a first distance based on locations of first pixels that received the reflective light, and identify a second distance based on locations of the second pixels that received the reflective light, and calculate a difference between the first and second distances, and based on a distance acquired by the calculation and a moving distance of the electronic apparatus identified through the second sensor, identify whether the reflective light is reflective light reflected by an object or reflective light that was reflected on the object and then reflected again by another object.

12 Claims, 24 Drawing Sheets

(56) References Cited

U.S. PATENT DOCUMENTS

| | | | |
|---|---|---|---|
| 2017/0123067 A1 | 5/2017 | Van Der Tempel | |
| 2017/0322309 A1* | 11/2017 | Godbaz | H04N 5/2173 |
| 2018/0267153 A1 | 9/2018 | Komuro et al. | |
| 2018/0341020 A1 | 11/2018 | Magee et al. | |
| 2019/0293765 A1 | 9/2019 | Jeong et al. | |
| 2020/0033451 A1 | 1/2020 | Koyama et al. | |

FOREIGN PATENT DOCUMENTS

| | | |
|---|---|---|
| KR | 10-1523046 B1 | 5/2015 |
| KR | 10-2017-0105295 A | 9/2017 |
| KR | 10-2019-0014313 A | 2/2019 |

OTHER PUBLICATIONS

Written Opinion (PCT/ISA/237) dated Jul. 15, 2020 issued by the International Searching Authority in corresponding International Application No. PCT/KR2020/004791.

Communication dated Mar. 17, 2022 issued by the European Patent Office in European Patent Application No. 20834978.7.

\* cited by examiner

FIG. 4

| ROW OF PIXELS | DISTANCE TO AN OBJECT (m) |
|---|---|
| 1 | 15.0 |
| 2 | 14.5 |
| 3 | 14.0 |
| 4 | 13.5 |
| 5 | 13.0 |
| ⋮ | ⋮ |
| 10 | 10.5 |
| ⋮ | ⋮ |
| 15 | 8.0 |
| 16 | 7.5 |
| ⋮ | ⋮ |
| 20 | 5.5 |
| 21 | 5.0 |
| 22 | 4.5 |
| ⋮ | ⋮ |
| 30 | 0.5 |

ELECTRONIC APPARATUS AND CONTROL METHOD THEREOF

CROSS-REFERENCE TO RELATED APPLICATION(S)

This application is based on and claims priority under 35 U.S.C. § 119(a) to Korean Patent Application No. 10-2019-0078850, filed on Jul. 1, 2019, and Korean Patent Application No. 10-2019-0151982, filed on Nov. 25, 2019, in the Korean Intellectual Property Office, the disclosures of which are incorporated by reference herein in their entireties.

BACKGROUND

1. Field

The disclosure relates to an electronic apparatus and a control method thereof, and more particularly, to an electronic apparatus that is capable of detecting objects and a control method thereof.

2. Description of Related Art

With the recent developments in electronic technologies, various types of electronic apparatuses such as autonomous vehicles that perform self-driving (i.e., without human drivers), automated guided vehicles that carry goods to destinations, and robot cleaners that move around homes and spaces and perform cleaning are being developed.

The types of electronic apparatuses mentioned above need to detect objects around the electronic apparatuses or distances between the electronic apparatuses and the detected objects, for preventing collision with objects while driving or moving in an autonomous manner. Recently, to assist with detecting the objects and the distances, electronic apparatuses having sensors based on light sources (e.g., image sensors or LIDAR sensors, etc.) installed thereon are being developed.

In related art electronic apparatuses having a sensor based on a light source installed thereon, the electronic apparatus radiates light, and if a reflected light is received, the electronic apparatus recognizes that an object exists around the electronic apparatus. However, reflective light may not be light directly reflected from an object, but may be light that is reflected on an object, which was then reflected again on another object (e.g., a floor surface or a wall surface, etc.). In the case of the latter, there is a problem accuracy, as the related art electronic apparatus may recognize an object that does not actually exist as existing in its surrounding.

SUMMARY

According to an aspect of the disclosure, there is provided an electronic apparatus comprising: a light source configured to radiate light; a first sensor configured to receive reflective light based on the light radiated from the light source, the reflective light comprising first reflective light and second reflective light; a second sensor configured to detect a moving distance of the electronic apparatus; and a processor configured to: based on the first reflective light corresponding to the light radiated by the light source being received at first pixels among a plurality of pixels included in the first sensor, identify a first distance based on locations of the first pixels in the first sensor that received the first reflective light, based on the second reflective light corresponding to the light radiated by the light source being received at second pixels among the plurality of pixels included in the first sensor, identify a second distance based on locations of the second pixels in the first sensor that received the second reflective light, obtain a difference in distance between the first distance and the second distance, and based on the difference in distance and the moving distance of the electronic apparatus detected by the second sensor, identify whether the reflective light is light reflected by an object or light reflected on the object and subsequently reflected by another surface The electronic apparatus may further comprise a memory configured to store distance information on distances which are respectively associated with rows of the plurality of pixels, wherein the processor is further configured to: based on information on a row of the first pixels that received the first reflective light, identify the first distance, and based on information on a row of the second pixels that received the second reflective light, identify the second distance.

The processor may be further configured to: based on the difference in distance being smaller than or equal to a predetermined threshold value, identify the reflective light as being reflected by the object, and based on the difference in distance exceeding the predetermined threshold value, identify the reflective light as being reflected again by the another surface.

The processor may be further configured to identify pixels, among the plurality of pixels included in the first sensor, having brightness values greater than or equal to a predetermined brightness value as pixels that received the reflective light.

The plurality of pixels included in the first sensor may output electronic signals having different magnitudes according to an amount of the received reflective light on each of the plurality of pixels, and the processor may be further configured to identify pixels, among the plurality of pixels included in the first sensor, output electronic signals greater than or equal to a predetermined magnitude as pixels that received the reflective light.

The processor may be further configured to, based on the reflective light being received at pixels in different rows of a same column among the plurality of pixels included in the first sensor, control the second sensor to detect the moving distance of the electronic apparatus.

According to another aspect of the disclosure, there is provided a control method of an electronic apparatus, the control method comprising: receiving information on reflective light based on light radiated from a light source, the reflective light comprising first reflective light and second reflective light; based on the first reflective light corresponding to the light radiated by the light source being received at first pixels among a plurality of pixels included in a first sensor, identifying a first distance based on rows of the first pixels in the first sensor that received the first reflective light; based on the second reflective light corresponding to the light radiated by the light source being received at second pixels among the plurality of pixels included in the first sensor, identifying a second distance based on rows of the second pixels in the first sensor that received the second reflective light; obtaining a difference in distance between the first distance and the second distance; and based on the difference in distance and a moving distance of the electronic apparatus detected by a second sensor, identifying whether the reflective light is light reflected by an object or light that was reflected on the object and subsequently reflected by another surface.

The control method may further comprise storing distance information on distances which are respectively associated with rows of the plurality of pixels, wherein the identifying the first distance comprises, based on information on a row of the first pixels that received the first reflective light, identifying the first distance, and the identifying the second distance comprises, based on information on a row of the second pixels that received the second reflective light, identifying the second distance.

The identifying may comprise: based on the difference in distance being smaller than or equal to a predetermined threshold value, identifying the reflective light as being reflected by the object, and based on the difference in distance exceeding the predetermined threshold value, identifying the reflective light as being reflected again by the another surface.

The control method may further comprise identifying pixels, among the plurality of pixels included in the first sensor, having brightness values greater than or equal to a predetermined brightness value as pixels that received the reflective light.

The control method may further comprise identifying pixels, among the plurality of pixels included in the first sensor, outputting electronic signals greater than or equal to a predetermined magnitude as pixels that received the reflective light.

The control method may further comprise, based on the reflective light being received at pixels in different rows of a same column among the plurality of pixels included in the first sensor, controlling the second sensor to detect the moving distance of the electronic apparatus.

According to another aspect of the disclosure, there is provided an electronic apparatus comprising: a light source configured to radiate light having a specific pattern; a sensor configured to receive reflective light based on the light; and a processor configured to, based on the reflective light being received at the sensor based on the light radiated by the light source, identify whether the reflective light is light reflected by an object or light that is reflected by the object and subsequently reflected again by another surface based on the specific pattern of the radiated light and a pattern of the reflective light received at the sensor.

The processor may be further configured to: based on the reflective light having the specific pattern, identify the reflective light as being reflected by the object, and based on the reflective light having a pattern symmetrical with the specific pattern, identify the reflective light as being reflected again by the another object.

The specific pattern may comprise one of a pattern in which upper and lower sides are asymmetrical, a pattern in which left and right sides are asymmetrical, or a pattern which upper, lower, left, and right sides are asymmetrical, and wherein the processor is further configured to, based on the reflective light having a pattern symmetrical with the specific pattern, identify the reflective light as light reflected again by the another surface.

According to another aspect of the disclosure, there is provided an electronic apparatus comprising: a memory configured to store one or more instructions; and a processor configured to execute the one or more instructions to: receive reflective light information corresponding to reflective light captured by a sensor, the reflective light information comprising first reflective light information and second reflective light information; identify a first distance based on the first reflective light information; identify a second distance based on the second reflective light information; obtain a difference value between the first distance and the second distance; and identify whether the reflective light information corresponds to a direct reflection of light from a surface of an object based on the difference value.

The first distance may be identified based on locations of first pixels corresponding to the reflective light in the first reflective light information, and the second distance is identified based on locations of second pixels corresponding to the reflective light in the second reflective light information.

The sensor may comprise a first sensor located at a first location and a second sensor located at a second location different from the first location, and the first reflective light information may be provided by the first sensor and the second reflective light information is provided by the second sensor.

The first reflective light information may correspond to first reflected light captured at a first time, and the second reflective light information corresponds to second reflected light captured at a second time different from the first time.

The processor may be further configured to identify whether the reflective light information corresponds to light reflected by a first surface onto a second surface and subsequently reflected by the second surface onto the sensor, based on the difference value and based on a moving distance detected by another sensor, and wherein the first surface is a surface of an object.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a diagram illustrating information on distances matched with each row of pixels according to an embodiment;

DETAILED DESCRIPTION

The disclosure provides an electronic apparatus that is capable of distinguishing reflective light reflected by an object and reflective light that was reflected on an object and then reflected again by another object (e.g., a floor surface or a wall surface, etc.), and a control method thereof.

For terms used in this disclosure and the claims, general terms were selected in consideration of the functions described in the disclosure. However, the terms may vary depending on the intention of those skilled in the art who work in the pertinent field, legal or technical interpretation, emergence of new technologies, etc. Also, there are some terms that were designated by the applicant on his own, and the meaning of the terms may be interpreted as defined in this specification. Meanwhile, if there is no specific definition of terms, the terms may be interpreted based on the overall content of this specification and common technical knowledge in the art.

Also, in explaining the disclosure, in case it is identified that detailed explanation of related known functions or features may unnecessarily confuse the gist of the disclosure, the detailed explanation will be abridged or omitted.

Further, while the embodiments will be described in detail with reference to the accompanying drawings and the contents described in the accompanying drawings, the disclosure is not restricted or limited by the embodiments.

Hereinafter, the disclosure will be described in detail with reference to the accompanying drawings.

Figure 1:
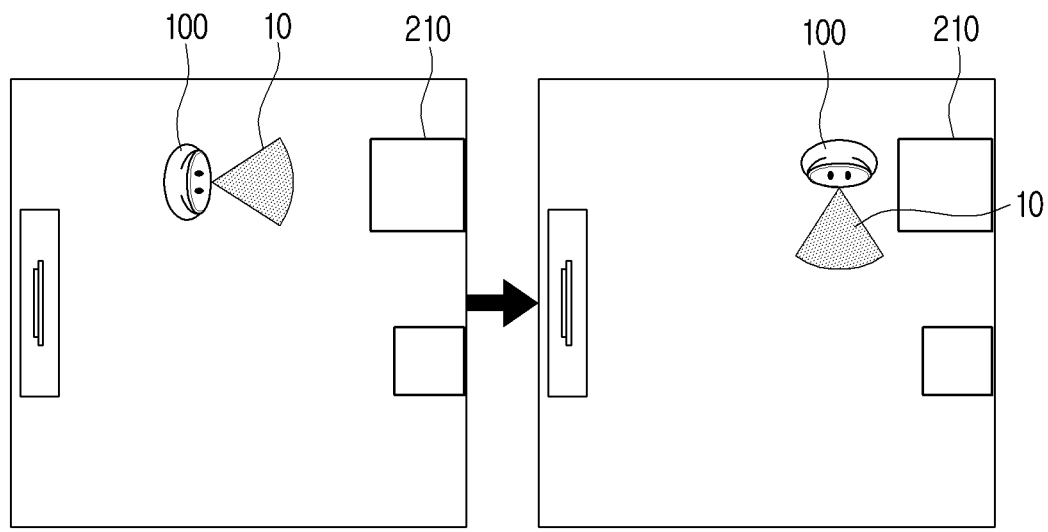
FIG. 1 is a diagram for schematically illustrating an electronic apparatus according to an embodiment.

FIG. 1 is a diagram for schematically illustrating an electronic apparatus according to an embodiment.

The electronic apparatus 100 according to an embodiment may be one of an autonomous vehicle that can perform self-driving (i.e., without human drivers), an automated guided vehicle that can classify goods by itself and carry goods to destinations, or a robot cleaner that can move or drive around spaces in a home and perform cleaning.

However, the disclosure is not limited thereto, and the electronic apparatus 100 may be implemented as various electronic apparatuses such as a robot that can perform an air purifying job while driving around spaces in a building, a housework supporting type robot that can perform jobs such as arranging clothes and dishwashing while driving around spaces in a home, a guard type robot that can perform guard while driving around spaces in a building, and a robot that can perform guiding of a store or description of products, product demonstrations, etc.

As illustrated in FIG. 1, in case an object 210 is detected around the electronic apparatus 100, the electronic apparatus 100 may change the moving direction to avoid collision with the object 210. In order to avoid the collision, the electronic apparatus 100 may detect an object around the electronic apparatus 100, and identify a distance between the electronic apparatus 100 and the detected object based on an radiated light 10.

Hereinafter, description will be made with reference to FIGS. 2A, 2B, 3A, 3B and 4.

Figure 2A:
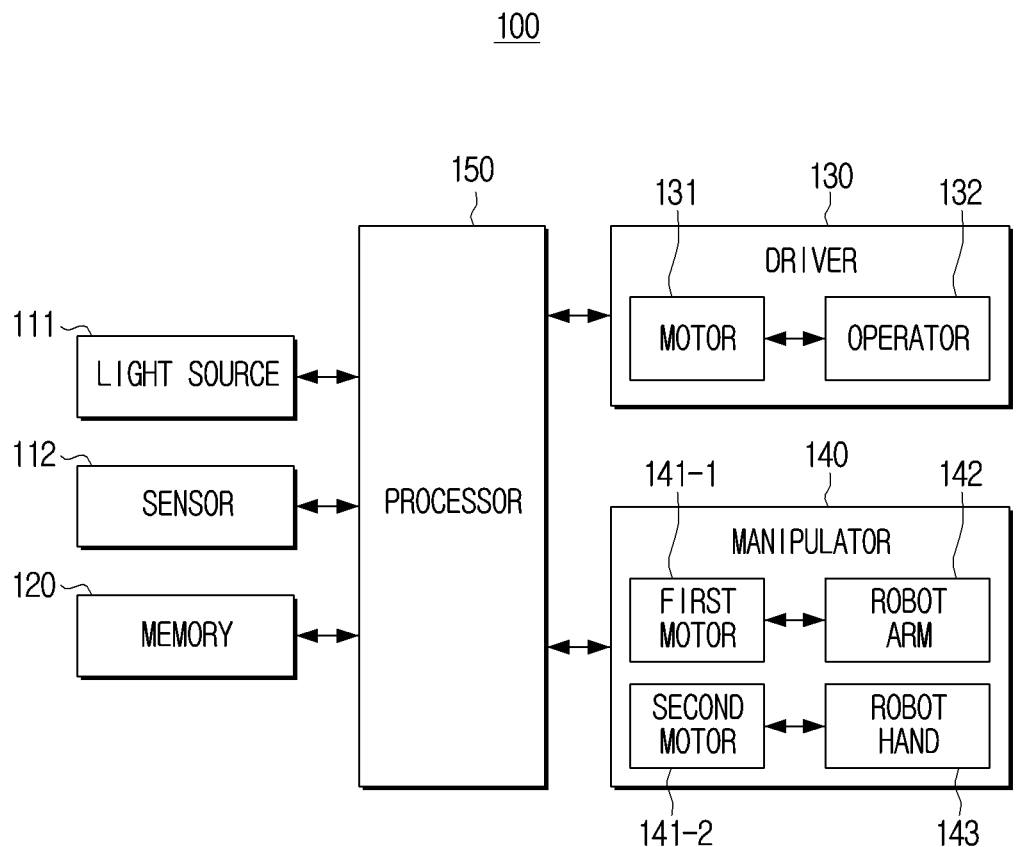
FIG. 2A is a block diagram of an electronic apparatus according to an embodiment.
Figure 2B:
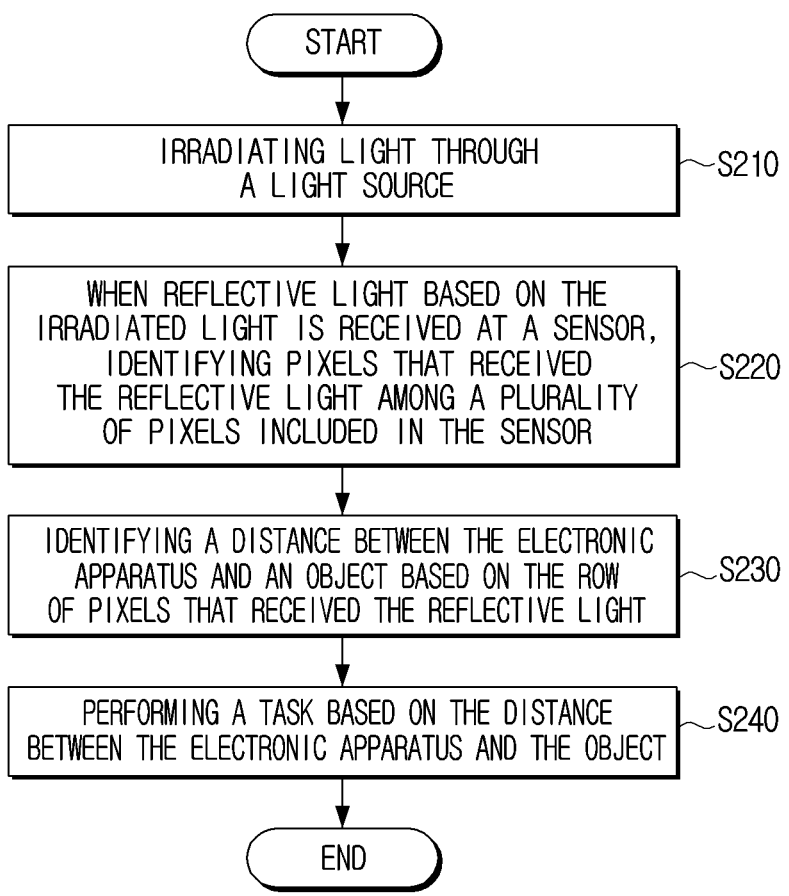
FIG. 2B is a flow chart for illustrating an operation of an electronic apparatus according to an embodiment.

FIG. 2A is a block diagram of an electronic apparatus according to an embodiment, and FIG. 2B is a flow chart for illustrating an operation of an electronic apparatus according to an embodiment.

Referring to FIG. 2A, the electronic apparatus 100 according to an embodiment may include a light source 111, a sensor 112, a memory 120, a driver 130, a manipulator 140, and a processor 150. While these components are components of the electronic apparatus 100 according to an embodiment, according to another embodiment, the electronic apparatus 100 may be implemented with some components among the aforementioned components being excluded, or implemented with additional components other than the aforementioned components.

The electronic apparatus 100 may radiate S210 light through the light source 111. Specifically, the processor 150 of the electronic apparatus 100 may control the light source 111 to radiate light, and the light source 111 may radiate light according to control of the processor 150. As an example, if a user command for turning on the power of the electronic apparatus 100 or a user command for moving the electronic apparatus 100 is received, the processor 150 may control the light source 111 to radiate light.

According to an embodiment, a shape of radiation of light may be in the form of, for example, a fan, but is not necessarily limited thereto, and the form of radiation of light may be various forms such as the form of a triangle.

Also, the electronic apparatus 100 may receive reflective light of the light radiated through the light source 111 through the sensor 112. As an example, in case light radiated by the light source 111 is reflected by an object, the sensor 112 of the electronic apparatus 100 may receive the reflective light.

Here, the sensor 112 may be implemented as an image sensor including a plurality of pixels. As an example, the sensor 112 may be formed as a plate. According to an embodiment, the plate may be a square wherein a plurality of pixels are integrated, but is not necessarily limited thereto.

Figure 3A:
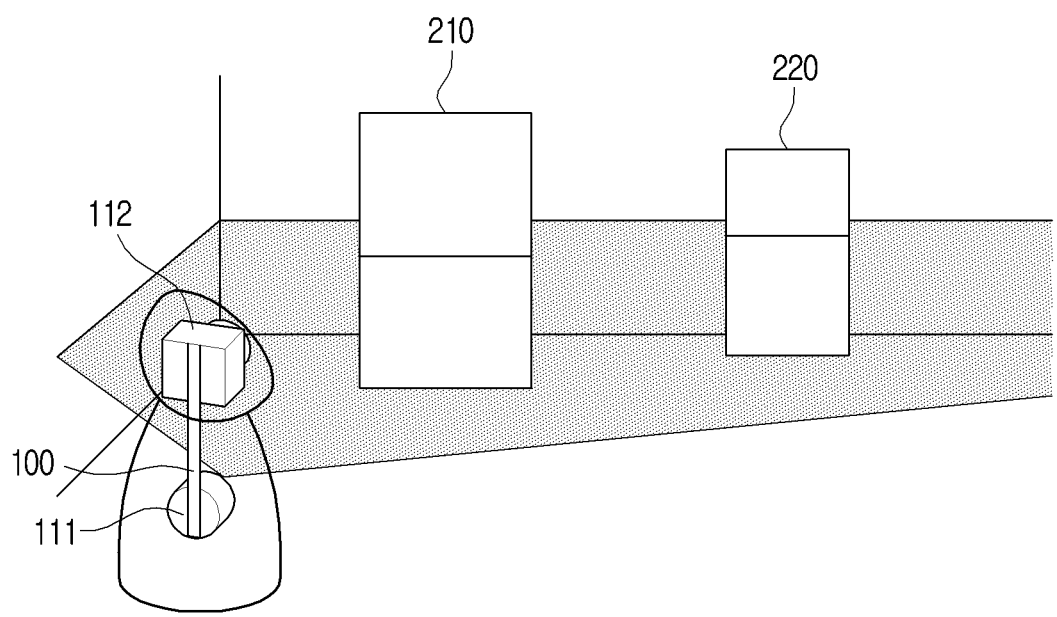
FIG. 3A is a diagram for illustrating an example wherein an electronic apparatus according to an embodiment radiates light.
Figure 3B:
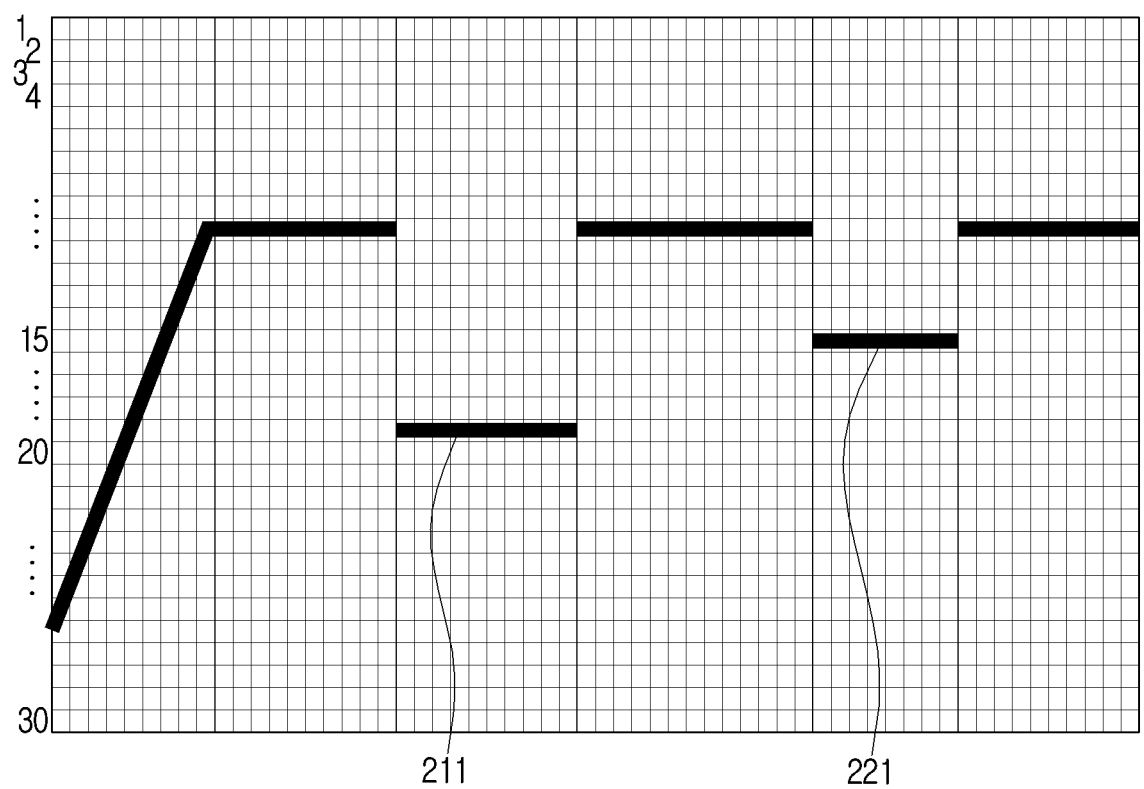
FIG. 3B is a diagram illustrating reflective light received at a sensor according to an embodiment.

For example, as illustrated in FIG. 3A, in a case light is radiated in a direction, in which, a first object 210 and a second object 220 are located, the sensor 112 may receive a plurality of reflective lights, as illustrated in FIG. 3B. In FIG. 3B, the first reflective light 211 is reflective light reflected by the first object 210, and the second reflective light 221 is reflective light reflected by the second object 220, and the other reflective lights may be reflective lights reflected by the wall surface.

Referring to FIG. 2B, operation S220, when reflective light based on light radiated by the light source 111 is received at the sensor 112, the electronic apparatus 100 may identify pixels that received the reflective light among the plurality of pixels included in the sensor 112.

Specifically, the processor 150 may identify pixels having brightness values greater than or equal to a predetermined brightness value among the plurality of pixels included in the sensor 112 as pixels that received reflective light. More specifically, the plurality of pixels included in the sensor 112 may output electronic signals in different sizes according to the degree of receiving light. According to an embodiment, the plurality of pixels included in the sensor 112 may include photodiodes for converting light energy into an electronic signal.

Thereafter, according to an embodiment, the processor 150 may control an analog to digital converter (ADC) to convert an electronic signal output by the sensor 112 into a digital signal, and identify pixels having brightness values greater than or equal to a predetermined brightness value among the plurality of pixels included in the sensor 112 based on a digital signal received from the ADC. That is, the processor 150 may identify pixels that output electronic signals greater than or equal to a predetermined size as pixels that received reflective light, based on the size of the digital signal received from the ADC. Meanwhile, here, it was described that the processor 150 receives a digital signal from a separate ADC, but a digital signal may be received from the sensor 112. In this case, the sensor 112 may convert an electronic signal into a digital signal through the ADC provided on the sensor 112, and output the signal to the processor 150.

According to an embodiment, the processor 150 may identify pixels that received reflective light among the plurality of pixels included in the sensor 112 through various methods. As an example, the processor 150 may generate an image based on electronic signals received from the plurality of pixels included in the sensor 112, and identify pixels that received reflective light among the plurality of pixels included in the sensor 112 through image analysis. Specifically, the processor 150 may generate an image based on electronic signals output by a plurality of pixels, and apply an object detection algorithm (e.g., an edge detection algorithm, etc.) to the generated image, and identify reflective light in the image. Also, the processor 150 may identify pixels wherein the identified reflective light is located among a plurality of pixels constituting the image as pixels that received the aforementioned reflective light.

Referring to FIG. 2B, operation S230, the electronic apparatus 100 may identify a distance between the electronic apparatus 100 and an object based on the rows of the pixels that received the reflective light.

According to an embodiment, the memory 120 of the electronic apparatus 100 may match information on different distances for each row of a plurality of pixels and store the information. As an example, the memory 120 of the electronic apparatus 100 may store information on distances wherein different distances are matched with each row of pixels, as in FIG. 4. Here, the distance matched with each pixel may be a distance between the light source 111 and an object that reflected light. The embodiment illustrated in FIG. 4 is merely an example, and distances matched with each row of pixels can obviously be different from FIG. 4.

Accordingly, as illustrated in FIG. 3B, in case the first reflective light 211 was received at the pixels in the row 20 among the plurality of pixels included in the sensor 112, the electronic apparatus 100 may identify a distance from the light source 111 to the first object 210 based on information on a distance matched with the row 20. As in FIG. 4, if a distance matched with the row 20 is 5.5 m, the electronic apparatus 100 may identify the distance from the light source 111 to the first object 210 as 5.5 m.

The memory 120 of the electronic apparatus 100 according to an embodiment may store information on distances wherein a distance between the sensor 112 and an object that reflected light is matched with each row of pixels. In this case, the processor 150 may identify the distance between the sensor 112 and the object that reflected light based on information on the rows of pixels that received reflective light and the distance between the sensor 112 and the object that reflected light matched with each row of pixels. Also, the processor 150 may identify the distance from the light source 111 to the object based on the distance between the sensor 112 and the object that reflected light, the radiation angle of the light source 111, and the distance from the light source 111 to the sensor 112. Here, the radiation angle of the light source 111 may be an angle that a virtual line connecting from the light source 111 to the sensor 112 and a virtual line toward the front surface of the light source 111 constitute. Specifically, the processor 150 may identify the distance from the light source 111 to the object by applying a triangulation method to the distance between the sensor 112 and the object that reflected light, the radiation angle of the light source 111, and the distance from the light source 111 to the sensor 112. Here, as a triangulation method is a known technology, detailed explanation will be omitted. The radiation angle of the light source 111 and the distance from the light source 111 to the sensor 112 may be stored in the memory 120 of the electronic apparatus 100 in advance.

Referring to FIG. 2B, operation S240, the electronic apparatus 100 may perform a task based on a distance between the electronic apparatus 100 and an object. Specifically, the processor 150 of the electronic apparatus 100 may identify a distance from the electronic apparatus 100 to an object through the aforementioned method, and control the driver 130 or the manipulator 140 of the electronic apparatus 100 such that collision with the object is prevented.

As an example, the processor 150 may control the driver 130 such that the electronic apparatus 100 moves in a direction that avoid collision with an object. Referring to FIG. 2A, the driver 130 is a component including a motor 131 and an operator 132 connected to the motor 131, and the operator 132 may be implemented as a wheel or a leg of a robot, etc., and the motor 131 may move the electronic apparatus 100 by controlling the operator 132 according to control of the processor 150. As an example, in case the operator 132 is implemented as a wheel on the left side and a wheel on the right side, in order to move the electronic apparatus 100 in a direction of not colliding with an object in the front, the processor 150 may transmit a control signal for generating a first rotating force to a motor rotating the wheel on the left side, and transmit a control signal for generating a second rotating force different from the first rotating force to a motor rotating the wheel on the right side, and thereby change the driving direction of the electronic apparatus 100.

Also, the processor 150 may control the manipulator 140 of the electronic apparatus 100 to perform a movement that avoids collision with an object. Here, the manipulator 140 may include a first motor 141-1, a robot arm 142 connected to the first motor 141-1, a second motor 141-2, and a robot hand 143 connected to the second motor 141-2. Also, the robot arm 142 and the robot hand 143 may be connected through a connector, and the robot arm 142 may perform a three-dimensional movement or rotation, etc., according to driving of the first motor 141-1 connected to the robot arm 142, and the robot hand 143 may perform a three-dimensional movement, rotation, or product grip, etc., according to driving of the second motor 141-2 connected to the robot hand 143. As an example, the processor 150 may transmit a control signal for rotating the robot arm 142 in a direction of not colliding with an object in the front to the first motor 141-1 connected to the robot arm 142, and thereby prevent a case wherein the robot arm 142 collides with an object. Also, the processor 150 may transmit a control signal for moving the robot hand 143 three-dimensionally in a direction of not colliding with an object in the front to the second motor 141-2 connected to the robot hand 143, and thereby prevent a case wherein the robot hand 143 collides with an object.

The reflective light received at the sensor 112 may not be light directly reflected from an object, but may be light reflected on an object and then reflected again by another object (e.g., a floor surface or a wall surface).

Figure 5A:
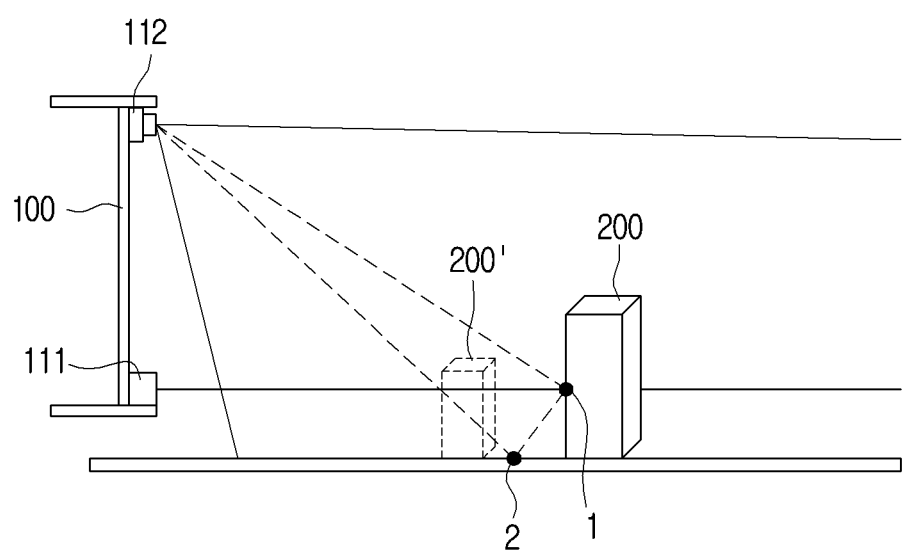
FIG. 5A is a diagram for illustrating an example wherein an electronic apparatus according to an embodiment receives a plurality of reflective lights.

For example, in case the floor surface around an object is a reflective material, as illustrated in FIG. 5A, the sensor 112 may receive reflective light reflected by the surface 1 of the object 200 and reflective light reflected on the surface 1 of the object 200 and then reflected again by the floor surface 2.

Figure 5B:
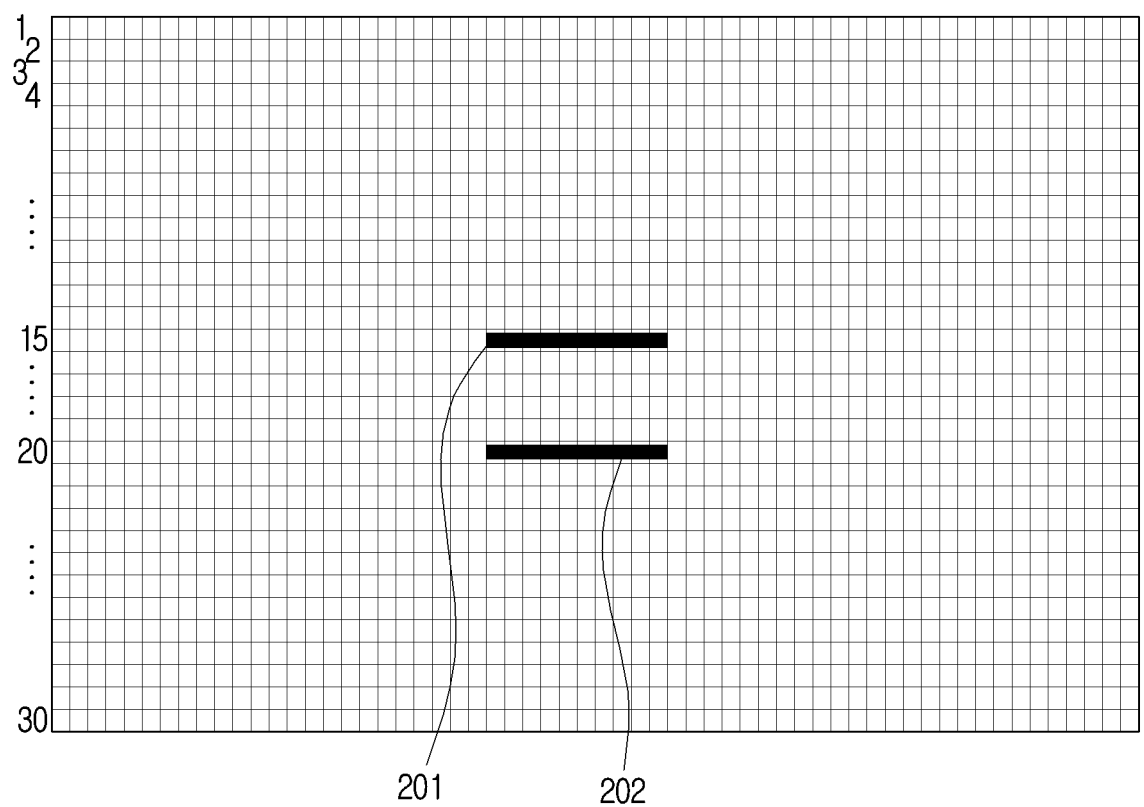
FIG. 5B is a diagram illustrating reflective light received at a sensor according to an embodiment.

In this case, as illustrated in FIG. 5B, the sensor 112 may receive a first light 201 reflected by the surface 1 of the object 200 and a second reflective light 202 reflected on the surface 1 of the object 200 and then reflected again by the floor surface 2.

Here, the related art electronic apparatus identifies that a first object 200 existed in a location identified based on the first reflective light 201, and a second object 200' existed in a location identified based on the second reflective light 202.

However, as described above, the second reflective light 202 is reflective light reflected on the surface 1 of the object 200 and then reflected again by the floor surface 2. As such, an object does not actually exist in a location identified based on the second reflective light 202.

Hereinafter, an operation for preventing misrecognition of an object according an embodiment of the disclosure as above will be described in detail.

Figure 6A:
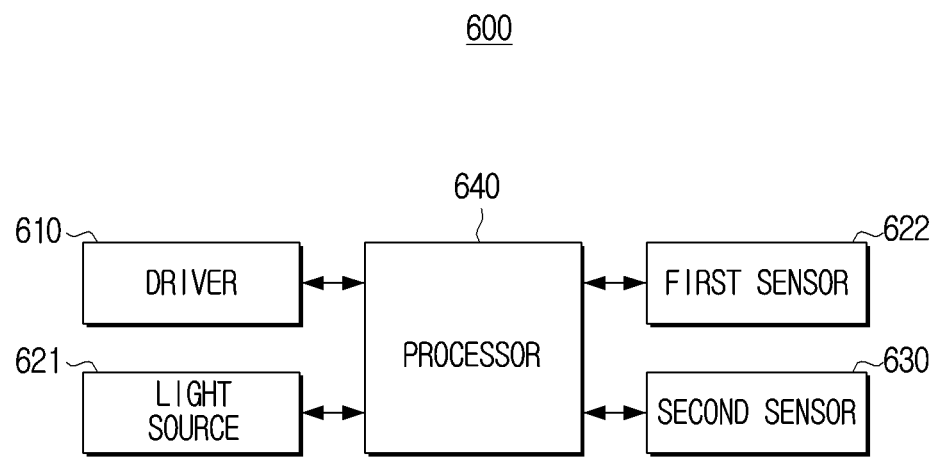
FIG. 6A is a block diagram of an electronic apparatus according to an embodiment.
Figure 6B:
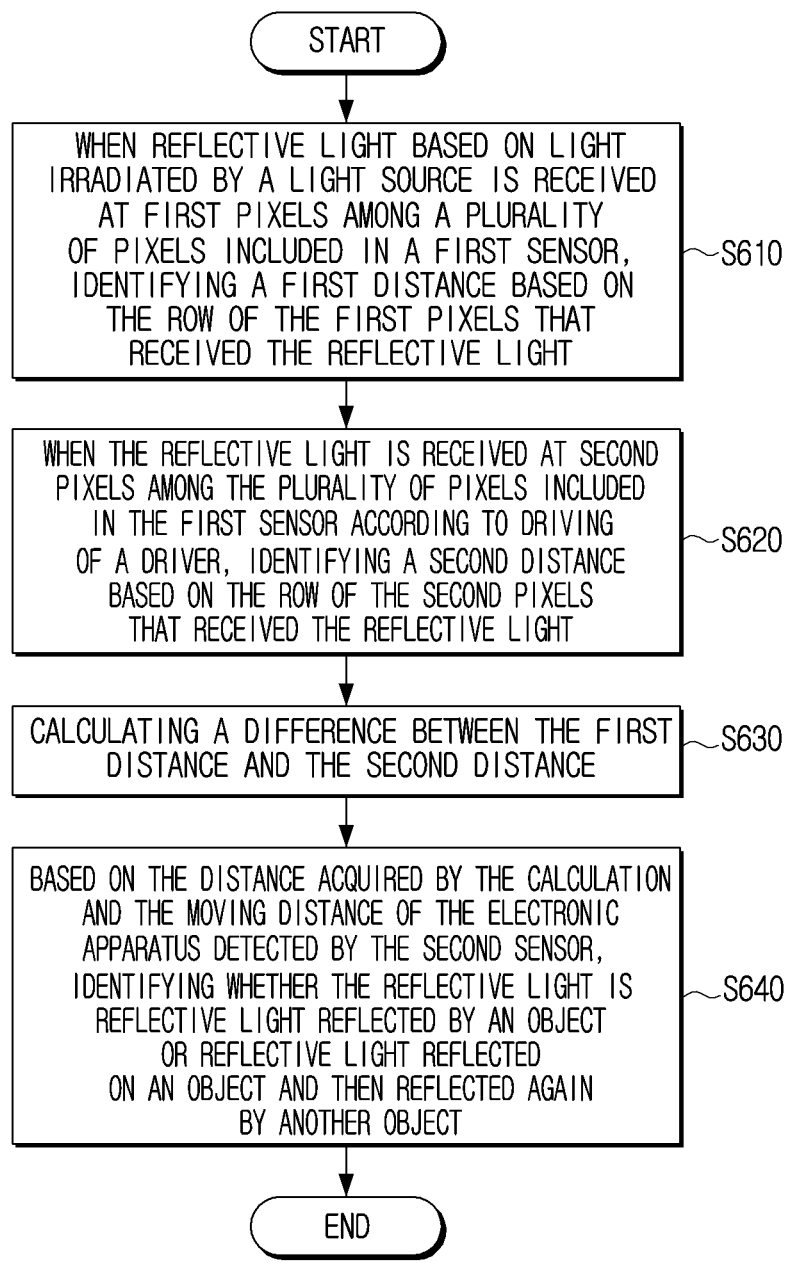
FIG. 6B is a flow chart for illustrating an operation of an electronic apparatus according to an embodiment.

FIG. 6A is a block diagram of an electronic apparatus according to an embodiment, and FIG. 6B is a flow chart for illustrating an operation of an electronic apparatus according to an embodiment.

Referring to FIG. 6A, the electronic apparatus 600 according to an embodiment may include a driver 610, a light source 621, a first sensor 622, a second sensor 630, and a processor 640. While these components are components according to an embodiment illustrated in FIG. 6A, according to another embodiment, the electronic apparatus 600 may be implemented with some components among the aforementioned components being excluded, or implemented with additional components other than the aforementioned components. Here, the electronic apparatus 600 may be implemented as various electronic apparatuses such as a robot like the aforementioned electronic apparatus 100 in FIG. 1 and FIG. 2A. Also, the light source 621 may perform the function (or similar functions) of the aforementioned light source 111, and the first sensor 622 may perform the function (or similar functions) of the aforementioned sensor 112.

The driver 610 may move the electronic apparatus 600. Here, the driver 610 is a component including an operator and a motor connected to the operator, and the operator of the driver 610 may be implemented as a wheel or a leg of a robot, etc., and the motor of the driver 610 may move the electronic apparatus 600 by controlling the operator according to control of the processor 640.

The light source 621 may radiate light. According to embodiments, the light source 621 may be implemented as various light sources that can radiate light such as a laser diode, a line laser, etc.

The first sensor 622 may receive reflective light. Specifically, the first sensor 622 may receive reflective light based on light radiated by the light source 621. Here, reflective light may not only be light reflected by an object, but may also be light reflected by an object and then reflected again by another object (e.g., a floor surface or a wall surface).

According to an embodiment, the second sensor 630 is a component that detects a moving information such as speed, acceleration, distance, etc., of the electronic apparatus 600. Here, the second sensor 630 may be various sensors such as an acceleration sensor, an ultrasonic sensor, an infrared sensor, a LIDAR sensor, etc. As an example, in case the second sensor 630 is implemented as an acceleration sensor, the processor 640 may perform an integral operation to the acceleration of the electronic apparatus 600 detected by the acceleration sensor and calculate the speed of the electronic apparatus 600, and identify the moving distance of the electronic apparatus 600 based on the time that the electronic apparatus 600 moved and the speed of the electronic apparatus 600.

According to another embodiment, in a case the second sensor 630 is implemented as an ultrasonic sensor, the ultrasonic sensor may emit an ultrasonic wave, and when the emitted ultrasonic wave is reflected by an object and received, the ultrasonic sensor may calculate the distance between the electronic apparatus 600 and the object based on the time period from radiation of the ultrasonic wave to reception of the ultrasonic wave. Then, the processor 640 may identify a difference between a first distance between the electronic apparatus 600 and the object acquired by the ultrasonic sensor in a first location and a second distance between the electronic apparatus 600 and the object acquired by the ultrasonic sensor in a second location as the moving distance of the electronic apparatus 600.

According to another embodiment, in a case the second sensor 630 is implemented as a LIDAR sensor, the LIDAR sensor may radiate light, and when the radiated light is reflected by an object and received, the LIDAR sensor may calculate the distance between the electronic apparatus 600 and the object based on the time period from radiation of the light to reception of the light. Then, the processor 640 may identify a difference between a first distance between the electronic apparatus 600 and the object acquired by the LIDAR sensor in a first location and a second distance between the electronic apparatus 600 and the object acquired by the LIDAR sensor in a second location as the moving distance of the electronic apparatus 600.

According to another embodiment, in a case the second sensor 630 is implemented as an infrared sensor, the infrared sensor may radiate light, and when the radiated light is reflected by an object and received, the infrared sensor may calculate the distance between the electronic apparatus 600 and the object based on the amount of the received light. In addition, the processor 640 may identify a difference between a first distance between the electronic apparatus 600 and the object acquired by the infrared sensor in a first location and a second distance between the electronic apparatus 600 and the object acquired by the infrared sensor in a second location as the moving distance of the electronic apparatus 600.

These embodiments are merely examples, and the electronic apparatus 600 may identify a moving distance of the electronic apparatus 600 through various methods. As an example, the electronic apparatus 600 may detect the number of rotations of a motor connected to the operator of the driver 610 through an encoder, and identify a moving distance of the electronic apparatus 600 based on the number of rotations of the motor.

The electronic apparatus 600 according to an embodiment may further include a memory. The memory may store an operating system (OS) for controlling the overall operations of the components of the electronic apparatus 600 and commands or data related to the components of the electronic apparatus 600.

In particular, the memory may store information about different distances. For instance, different distances are matched respectively with each row of a plurality of pixels included in the first sensor 622. As an example, the memory may store information different distances matched respectively with each row of pixels as illustrated in FIG. 4. Here, the distance matched with each pixel may be a distance between the light source 621 and an object that reflected light. The embodiment illustrated in FIG. 4 is merely an example, and distances matched with each row of pixels can obviously be different from FIG. 4.

Also, the memory may store information on distances, each of the distances may be a distance between the first sensor 622 and an object that reflected light is matched with each row of pixels. In this case, the processor 640 may identify the distance between the first sensor 622 and the object that reflected light based on information on the rows of pixels that received reflective light and the distance between the first sensor 622 and the object that reflected light matched with each row of pixels, and identify the distance from the light source 621 to the object by applying a triangulation method to the distance between the first sensor 622 and the object that reflected light, the radiation angle of the light source 621, and the distance from the light source 621 to the first sensor 622. The radiation angle of the light source 621 and the distance from the light source 621 to the first sensor 622 may be stored in the memory in advance.

The processor 640 controls the overall operations of the electronic apparatus 600. According to an embodiment, the processor 640 may include a central processing unit (CPU) or an application processor (AP). Also, the processor 640 may be implemented as at least one general processor, a digital signal processor, an application specific integrated circuit (ASIC), a system on chip (SoC), a microcomputer (MICOM), a driver IC, etc.

The processor 640 may identify whether reflective light is light reflected by an object or a light reflected by an object and then reflected again by another object such as a floor surface or a wall surface based on the degree that a location wherein reflective light is received is changed on the first sensor 622 according to movement of the electronic apparatus 600.

Hereinafter, description will be made with reference to FIGS. 6A, 6B, 7, 8A, and 8B.

Figure 7:
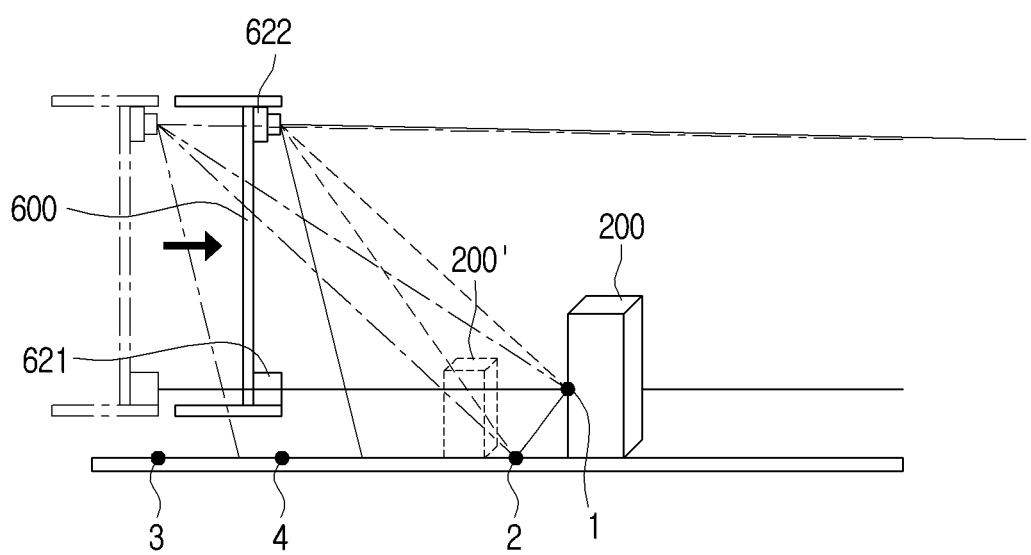
FIG. 7 is a diagram for illustrating an example wherein an electronic apparatus according to an embodiment radiates lights in first and second locations.
Figure 8A:
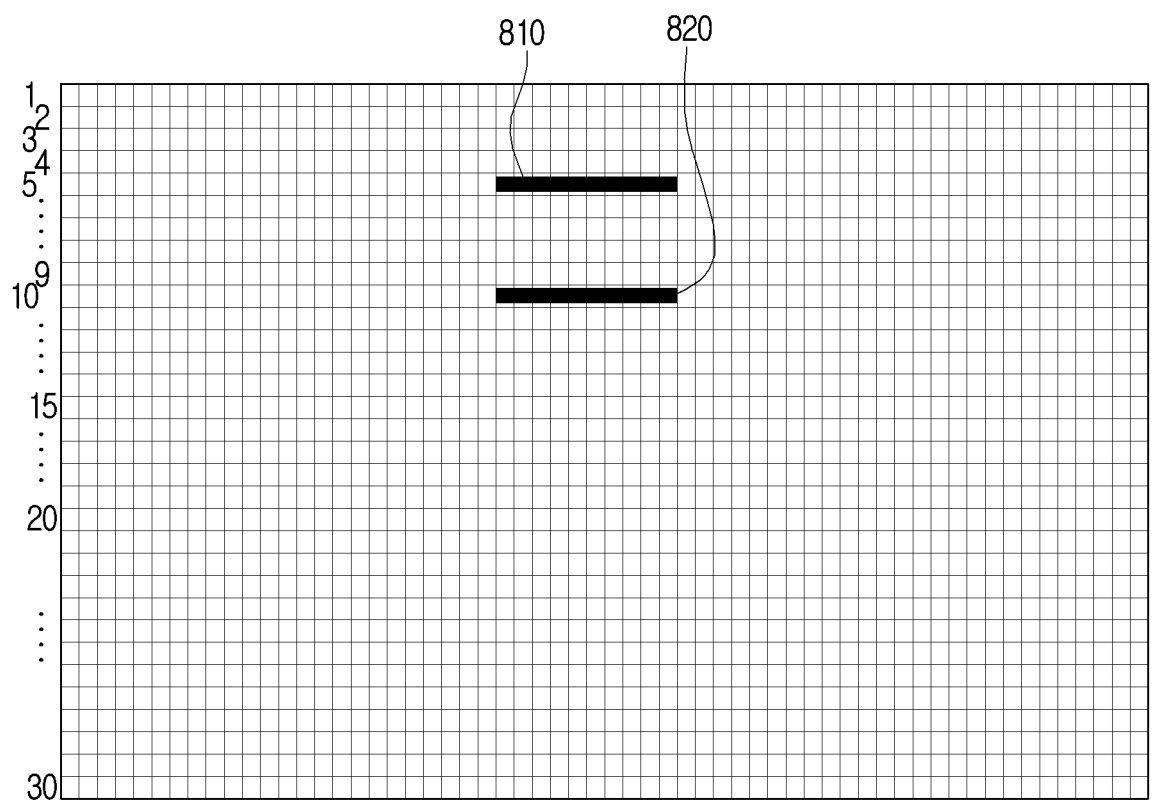
FIG. 8A is a diagram illustrating reflective light received in a first location according to an embodiment.

Referring to FIG. 7, the electronic apparatus 600 may radiate light through the light source 621 in a first location 3. Specifically, the processor 640 of the electronic apparatus 600 may control the light source 621 to radiate light, and the light source 621 may radiate light according to control of the processor 640. In this case, the first sensor 622 may receive first reflective light 810 and second reflective light 820 as illustrated in FIG. 8A. Here, the first reflective light 810 may be light reflected by an object 200, and the second reflective light 820 may be light reflected on the object 200 and then reflected again by a floor (or bottom) surface 2.

Referring the FIG. 6B, operation S610, the electronic apparatus 600 may identify a first distance based on the rows of pixels that received reflective light. According to an embodiment, when reflective light is received at the first sensor 622, the processor 640 of the electronic apparatus 600 may identify pixels that received reflective light among a plurality of pixels included in the first sensor 622. Specifically, the processor 640 may identify pixels having brightness values greater than or equal to a predetermined brightness value among the plurality of pixels included in the first sensor 622 as pixels that received reflective light. More specifically, the plurality of pixels included in the first sensor 622 may output electronic signals in different sizes according to the degree of receiving light. According to an embodiment, the plurality of pixels included in the first sensor 622 may include photodiodes for converting light energy into an electronic signal. Then, the processor 640 may control an analog to digital converter (ADC) to convert an electronic signal output by the first sensor 622 into a digital signal, and identify pixels having brightness values greater than or equal to a predetermined brightness value among the plurality of pixels included in the first sensor 622 based on a digital signal received from the ADC. That is, the processor 640 may identify pixels that output electronic signals greater than or equal to a predetermined size as pixels that received reflective light, based on the size of the digital signal received from the ADC. Meanwhile, here, it was described that the processor 640 receives a digital signal from a separate ADC, but a digital signal may be received from the first sensor 622. In this case, the first sensor 622 may convert an electronic signal into a digital signal through the ADC provided on the first sensor 622, and output the signal to the processor 640.

According to an embodiment, in a case where first and second reflective lights 810, 820 are received at the first sensor 622 as illustrated in FIG. 8A, the processor 640 may identify some pixels in the row 5 having brightness values greater than or equal to a predetermined value among the plurality of pixels included in the first sensor 622 as pixels that received the first reflective light 810, and some pixels in the row 10 as pixels that received the second reflective light 820.

This is merely an example, and the processor 640 may identify pixels that received reflective light among the plurality of pixels included in the first sensor 622 through various methods. As an example, the processor 640 may generate an image based on electronic signals output by the first the sensor 622, and identify pixels that received reflective light among the plurality of pixels included in the first sensor 622 through image analysis. Specifically, the processor 640 may generate an image based on electronic signals output by a plurality of pixels, and apply an object detection algorithm (e.g., an edge detection algorithm, etc.) to the generated image, and detect an object in the image. Also, the processor 640 may identify pixels including the detected object among a plurality of pixels constituting the image as pixels that received the aforementioned reflective light.

Then, the processor 640 may identify a distance corresponding to the row of a pixel that received the reflective light based on information that associates distances with rows of pixels of a sensor. For instance, different distances are respectively matched with each row of a plurality of pixels.

According to an embodiment, the electronic apparatus 600 may match information on different distances respectively with each row of a plurality of pixels and store the information, as described above. As an example, the electronic apparatus 600 may store information on distances wherein different distances are matched respectively with each row of a plurality of pixels, as illustrated in FIG. 4.

Accordingly, as illustrated in FIG. 8A, in a case in which the first reflective light 810 is received at a pixel in the row 5 among the plurality of pixels included in the first sensor 622, the processor 640 may identify a distance matched with the row that received the first reflective light 810 based on information on the distance matched with the row 5. As in FIG. 4, if the distance matched with the row 5 is 13 m, the processor 640 may identify the distance matched with the row that received the first reflective light 810 in the first location 3 as 13 m.

Also, the processor 640 may identify a distance matched with the row that received the second reflective light 820 based on information on the distance matched with the row 10. As in FIG. 4, if the distance matched with the row 10 is 10.5 m, the processor 640 may identify the distance matched with the row that received the second reflective light 820 in the first location 3 as 10.5 m.

The electronic apparatus 600 according to an embodiment may store information on distances wherein a distance between the first sensor 622 and an object that reflected light is matched with each row of pixels. In this case, the processor 640 may identify a distance between the first sensor 622 and an object that reflected light based on information on the rows of pixels that received reflective light and a distance between the first sensor 622 and an object that reflected light matched with each row of pixels. Also, the processor 640 may identify a distance from the light source 621 to an object based on the distance between the first sensor 622 and the object that reflected light, the radiation angle of the light source 621, and the distance from the light source 621 to the first sensor 622. Here, the radiation angle of the light source 621 may be an angle that a virtual line connecting from the light source 621 to the first sensor 622 and a virtual line toward the front surface of the light source 621 constitute. Specifically, the processor 640 may identify the distance from the light source 621 to the object by applying a triangulation method to the distance between the first sensor 622 and the object that reflected light, the radiation angle of the light source 621, and the distance from the light source 621 to the first sensor 622. Here, as a triangulation method is a known technology, detailed explanation will be omitted. The radiation angle of the light source 621 and the distance from the light source 621 to the first sensor 622 may be stored in the memory of the electronic apparatus 600 in advance.

Afterwards, the electronic apparatus 600 may move to a second location 4 according to driving of the driver 610. As an example, in case a user command for moving the electronic apparatus 600 is received, or the electronic apparatus 600 is performing a task based on driving, the electronic apparatus 600 may move to a second location 4 according to driving of the driver 610.

Referring the FIG. 6B, operation S620, in a case, if reflective light based on light radiated by the light source 621 in the second location 4 is received at second pixels among a plurality of pixels included in the first sensor 622, the electronic apparatus 600 may identify a second distance based on the rows of the second pixels that received the reflective light. As an example, in case the light source 621 radiated light on the second location 4 according to control of the processor 640, the first sensor 622 may receive a first reflective light 810' and a second reflective light 820' as in FIG. 8B.

Then, when the first reflective light 810' and the second reflective light 820' are received at the first sensor 622, the processor 640 may identify pixels having brightness values greater than or equal to a predetermined brightness value among the plurality of pixels included in the first sensor 622 as pixels that received the reflective lights. As explanation in this regard was made above, overlapping explanation will be omitted below.

Figure 8B:
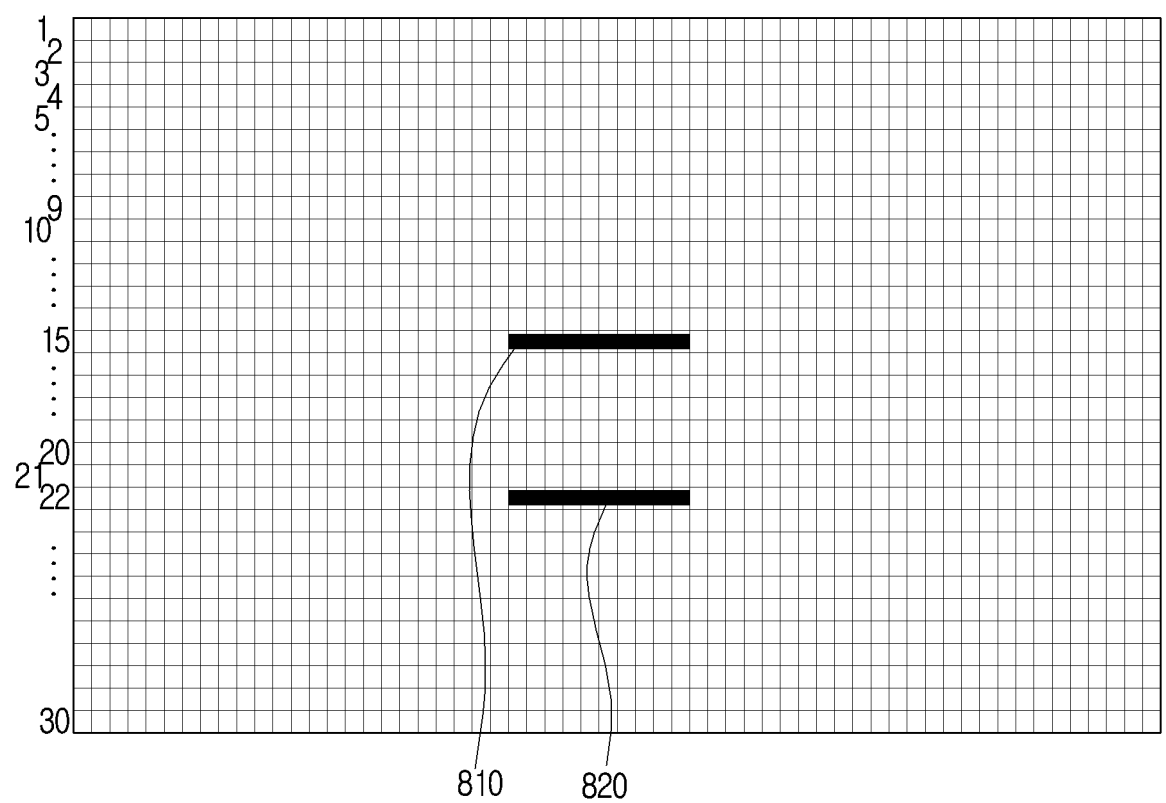
FIG. 8B is a diagram illustrating reflective light received in a second location according to an embodiment.

As an example, in a case reflective lights were received as in FIG. 8B, the processor 640 may identify pixels in the row 15 having brightness values greater than or equal to a predetermined brightness value as pixels that received the first reflective light 810', and identify pixels in the row 22 as pixels that received the second reflective light 820'.

Also, as described above, the processor 640 may identify a distance matched with the rows of pixels that received reflective light based on information on distances wherein different distances are respectively matched with each row of a plurality of pixels.

For example, as illustrated in FIG. 8B, in case the first reflective light 810' was received at the pixels in the row 15 among the plurality of pixels included in the first sensor 622, the processor 640 may identify a distance matched with the row that received the first reflective light 810' based on information on a distance matched with the row 15. As in FIG. 4, if a distance matched with the row 15 is 8 m, the processor 640 may identify the distance matched with the row that received the first reflective light 810' in the second location 4 as 8 m.

In a similar manner, the processor 640 may identify a distance matched with the row that received the second reflective light 820' based on information on a distance matched with the row 22. As in FIG. 4, if a distance matched with the row 22 is 4.5 m, the processor 640 may identify the distance matched with the row that received the second reflective light 820' in the second location 4 as 4.5 m.

In addition, referring to FIG. 6B, operation S630, the electronic apparatus 600 may calculate a difference between a first distance identified based on the location of the reflective light received in the first location 3 and a second distance identified based on the location of the reflective light received in the second location 4. According to an embodiment, the electronic apparatus 600 may calculate a difference between the distances for both the first reflective lights 810 and 810' and the second reflective lights 820 and 820'.

In the case of the aforementioned embodiment, the processor 640 may, in the case of the first reflective lights 810 and 810', calculate the difference between 13.5 m identified in the first location 3 and 8 m identified in the second location 4, and acquire distance information for 5.5 m, and in the case of the second reflective lights 820 and 820', the processor 640 may calculate the difference between 10.5 m identified in the first location 3 and 4.5 m identified in the second location 4, and acquire distance information for 6 m.

Here, the processor 640 may identify that the distance information acquired based on the first reflective lights 810 and 810' and the distance information acquired based on the second reflective lights 820 and 820' are different. This is based on the fact that the first reflective light 810 is reflective light reflected by the surface 1 of the object 200, and the second reflective light 820 is reflective light reflected on the surface 1 of the object 200 and then reflected again by the floor surface 2.

Specifically, in a case where the electronic apparatus 600 moves from the first location 3 to the second location 4, the difference between the row of pixels that received reflective light in the first location 3 and the row of pixels that received reflective light in the second location 4 may be different according to an angle between a virtual line connecting the first sensor 622 and the surface 1 of the object 200 that reflected light radiated on the first location 3 and a virtual line connecting the first sensor 622 and the surface 1 of the object 200 that reflected light radiated on the second location 4. As an example, as the aforementioned angle becomes bigger, the difference between the row of pixels that received reflective light in the first location 3 and the row of pixels that received reflective light in the second location 4 may become bigger, and as the aforementioned angle becomes smaller, the difference between the row of pixels that received reflective light in the first location 3 and the row of pixels that received reflective light in the second location 4 may become smaller.

Meanwhile, in the case of the floor surface 2, as the floor surface 2 is a location relatively closer to the electronic apparatus 600 than the surface 1 of the object 200, compared to an angle between a virtual line connecting the first sensor 622 and the surface 1 that reflected the light from the first location 3 and a virtual line connecting the first sensor 622 and the surface 1 that reflected the light from the second location 4, an angle between a virtual line connecting the first sensor 622 and the surface 2 that reflected the light from the first location 3 and a virtual line connecting the first sensor 622 and the surface 2 that reflected the light from the second location 4 may be bigger. Accordingly, the difference between the row of pixels that received reflective light in the first location 3 and the row of pixels that received the reflective light in the second location 4 may be bigger in the case of the second reflective light 820 reflected again by the floor surface 2 than in the case of the first reflective light 810 reflected by the surface 1 of the object 200. Accordingly, the distance information acquired based on the first reflective light 810 and the distance information acquired based on the second reflective light 820 may be different.

Meanwhile, while the electronic apparatus 600 moves from the first location 3 to the second location 4, the processor 640 may identify the moving distance of the electronic apparatus 600 based on information detected by the second sensor 630. Here, the second sensor 630 may be various sensors such as an acceleration sensor, an ultrasonic sensor, an infrared sensor, a LIDAR sensor, etc., as described above. As a method for identifying a moving distance of the electronic apparatus 600 through the second sensor 630 was described above, explanation in that regard will be omitted here.

Referring to FIG. 6B, operation S640, based on information on the moving distance of the electronic apparatus 600 identified through the second sensor 630 and the distance acquired by the aforementioned calculation, the electronic apparatus 600 may identify whether reflective light is light reflected by the object 200 or light reflected on the object 200 and then reflected again by the floor surface 2 (or another surface) around the object.

Specifically, if the difference between the moving distance of the electronic apparatus 600 identified through the second sensor 630 and the distance acquired by the aforementioned calculation is smaller than or equal to a predetermined threshold value (e.g., in case the moving distance of the electronic apparatus 600 identified through the second sensor 630 and the distance acquired by the calculation are the same), the processor 640 may identify that reflective light is light reflected by an object. Meanwhile, if the difference between the moving distance of the electronic apparatus 600 identified through the second sensor 630 and the distance acquired by the calculation exceeds a predetermined threshold value (e.g., in case the moving distance of the electronic apparatus 600 identified through the second sensor 630 and the distance acquired by the calculation are not the same), the electronic apparatus 600 may identify that reflective light is light reflected by an object and then reflected again by the floor surface around the object, etc.

Here, a predetermined threshold value may be 0.1 m, but this is merely an example, and a threshold value may be set or changed in various ways.

For example, as in the case of the aforementioned second reflective lights 820 and 820', if the distance acquired by the calculation is 4.5 m, and the moving distance of the electronic apparatus 600 identified through the second sensor 630 is 5.5 m, the processor 640 may identify the second reflective lights 820 and 820' as reflective light reflected on an object and then reflected again by the floor surface. Meanwhile, as in the case of the aforementioned first reflective lights 810 and 810', if the distance acquired by the calculation is 5.5 m, and the moving distance of the electronic apparatus 600 identified through the second sensor 630 is 5.5 m, the processor 640 may identify the first reflective light 810 as reflective light reflected by an object.

Meanwhile, based on the column of pixels that received reflective light, the processor 640 may identify in which directions on the left and right sides an object is located. As an example, the electronic apparatus 600 stores information on angles wherein different angles are matched with each column of pixels, and when reflective light is received, the processor 640 may identify an angle at which an object is located based on the front side of the electronic apparatus 600 based on an angle matched with the column of pixels that received the reflective light.

Then, in case a plurality of reflective lights are received at pixels in different rows of the same column among the plurality of pixels included in the first sensor 622, the processor 640 may control the second sensor 630 to detect the moving distance of the electronic apparatus 600. As an example, as illustrated in FIG. 8A or 8B, in case a plurality of reflective lights are received at the first sensor 622, and the column of pixels that received the reflective lights is the same, the processor 640 may control the second sensor 630 to detect the moving distance of the electronic apparatus 600.

This is in consideration of the fact that, in case a plurality of reflective lights are received at pixels in different rows of the same column, there is a high probability that some reflective lights among the plurality of reflective lights are reflective lights reflected again by the floor surface (in general, reflective light reflected again by a floor surface is reflected again by a floor surface in front of an object, and thus there is a high possibility that the reflective light is received at pixels in different rows on the same column), and accordingly, there is a high need to identify reflective lights reflected again by the floor surface, but in case a plurality of reflective lights in different columns are received, there is a high probability that the plurality of received reflective lights are not reflective lights reflected again by the floor surface. Accordingly, the disclosure can minimize the burden of operations of the processor 640, and save power.

Figure 9A:
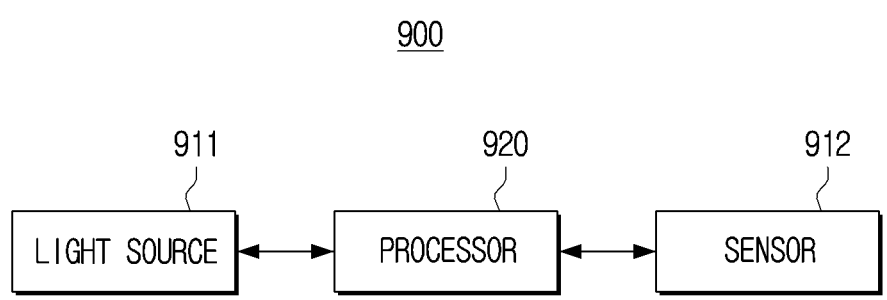
FIG. 9A is a block diagram for illustrating an electronic apparatus according to an embodiment.
Figure 9B:
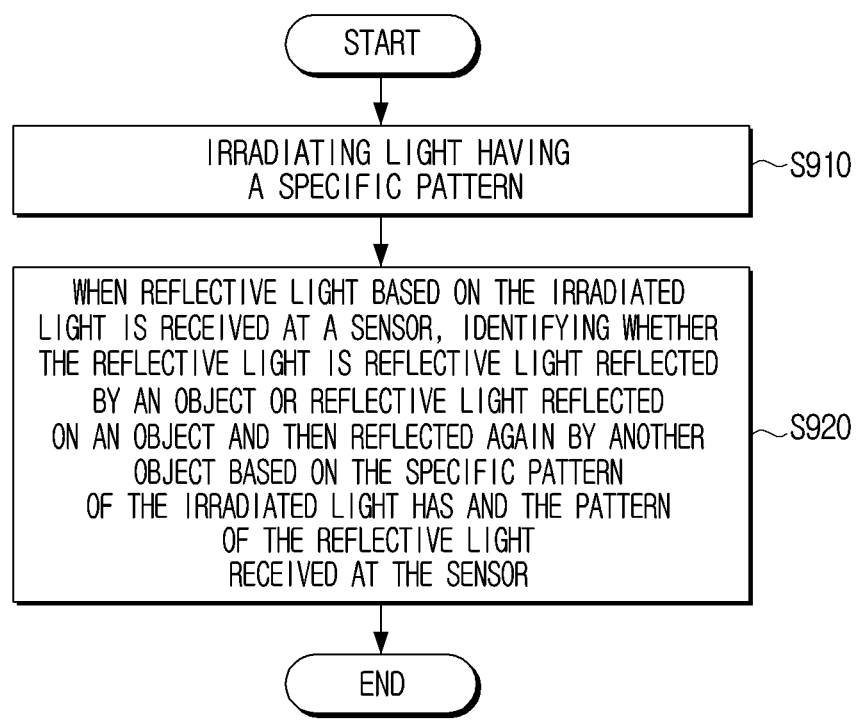
FIG. 9B is a flow chart for illustrating an operation of an electronic apparatus according to an embodiment.

FIG. 9A is a block diagram for illustrating an electronic apparatus 900 according to an embodiment, and FIG. 9B is a flow chart for illustrating an operation of an electronic apparatus 900 according to an embodiment.

Referring to FIG. 9A, the electronic apparatus 900 according to an embodiment may include a light source 911, a sensor 912, and a processor 920. Here, the electronic apparatus 900 may be implemented as various electronic apparatuses such as a robot like the aforementioned electronic apparatus 100. Also, the sensor 912 may perform the function of the aforementioned sensor 112 or the first sensor 622.

The light source 911 may radiate light. According to embodiments, the light source 911 may be implemented as various light sources that can radiate light such as a laser diode, a line laser, etc.

In particular, referring to FIG. 9B, operation S910, the light source 911 may radiate light having a specific pattern. Here, the specific pattern may be a pattern in which upper and lower sides are asymmetrical. For example, the light source 911 may radiate light having a triangle pattern. However, this is merely an example, and the specific pattern may be patterns in various shapes such as a pattern of which upper and lower sides are asymmetrical, a pattern of which left and right sides are asymmetrical, and a pattern of which upper, lower, left, and right sides are asymmetrical.

According to an embodiment, film that makes light having a specific pattern radiated may be attached on the light source 911. Alternatively, according to another embodiment, a cap that makes light having a specific pattern radiated may be coupled to a coupling part of the light source 911, and as light passes through the cap, light having a specific pattern may be radiated. Alternatively, according to another embodiment, as an arrangement of diodes included in the light source 911 is integrated in a specific pattern, light having a specific pattern may thereby be radiated. Also, the electronic apparatus 900 according to another embodiment may make only some light emitting parts among a plurality of light emitting parts (e.g., diodes) included in the light source 911 emit light such that light in a specific pattern is radiated, and thereby make light in a specific pattern radiated.

The sensor 912 may receive reflective light of light radiated by the light source 911. Here, reflective light may not only be light reflected by an object, but may also be light reflected by an object and then reflected again by another object such as a floor or a wall surface. Alternatively, reflective light may be light reflected on an object and then reflected again on another surface of the object.

The electronic apparatus 900 according to an embodiment may further include a memory. The memory may store an operating system (OS) for controlling the overall operations of the components of the electronic apparatus 900 and instructions or data related to the components of the electronic apparatus 900.

In particular, the memory may store information on at least one pattern. Here, a pattern may be patterns in various shapes such as a pattern of which upper and lower sides are asymmetrical, a pattern of which left and right sides are asymmetrical, and a pattern of which upper, lower, left, and right sides are asymmetrical. Also, information on patterns may include information on a plurality of light emitting parts for irradiating light in a specific pattern. Accordingly, the processor 920 may make only some light emitting parts among a plurality of light emitting parts (e.g., diodes) included in the light source 911 emit light based on information on patterns, such that light in a specific pattern is radiated.

The memory may store information on distances wherein different distances are matched with each row of the plurality of pixels included in the sensor 912. As an example, the memory may store information on distances wherein different distances are matched respectively with each row of pixels, as in FIG. 4. Here, the distance matched with each pixel may be a distance between the light source 111 and an object that reflected light. The embodiment illustrated in FIG. 4 is merely an example, and distances matched with each row of pixels can obviously be different from FIG. 4.

Also, the memory may store information on distances wherein a distance between the sensor 912 and an object that reflected light is matched with each row of pixels. In this case, the processor 920 may identify the distance between the sensor 912 and the object that reflected light based on information on the rows of pixels that received reflective light and the distance between the sensor 912 and the object that reflected light matched with each row of pixels, and identify the distance from the light source 911 to the object by applying a triangulation method to the distance between the sensor 912 and the object that reflected light, the radiation angle of the light source 911, and the distance from the light source 911 to the sensor 912. The radiation angle of the light source 911 and the distance from the light source 911 to the sensor 912 may be stored in the memory in advance.

The processor 920 may control the overall operations of the electronic apparatus 900. According to an embodiment, the processor 920 may include a central processing unit (CPU) or an application processor (AP). Also, the processor 920 may be implemented as at least one general processor, a digital signal processor, an application specific integrated circuit (ASIC), a system on chip (SoC), a microcomputer (MICOM), a driver IC, etc.

The electronic apparatus 900 may radiate light through the light source 911. Specifically, the processor 920 of the electronic apparatus 900 may control the light source 911 to radiate light, and the light source 911 may radiate light according to control of the processor 920.

In particular, the electronic apparatus 900 may radiate S910 light having a specific pattern through the light source 911, as described above. In this case, the sensor 912 may receive reflective light in case the light radiated by the light source 911 is reflected by an object. Alternatively, the sensor 912 may receive reflective light in case the light radiated by the light source 911 is reflected by an object and then reflected again by the floor surface.

Referring to FIG. 9B, operation S920, when reflective light is received at the sensor 912 based on the light radiated by the light source 911, the electronic apparatus 900 may identify whether the reflective light is light reflected by an object or light reflected on an object and then reflected again by another object based on the specific pattern that the radiated light has and the pattern of the reflective light received at the sensor 912.

Specifically, if reflective light is received at the sensor 912, the processor 920 may identify the pattern of the reflective light. According to an embodiment, when reflective light is received at the sensor 912, the processor 920 may identify pixels that received the reflective light among the plurality of pixels included in the sensor 912. As an example, the sensor 912 may identify pixels having brightness values greater than or equal to a predetermined brightness value among the plurality of pixels as pixels that received the reflective light. As explanation in this regard was made above, detailed explanation will be omitted.

Figure 10A:
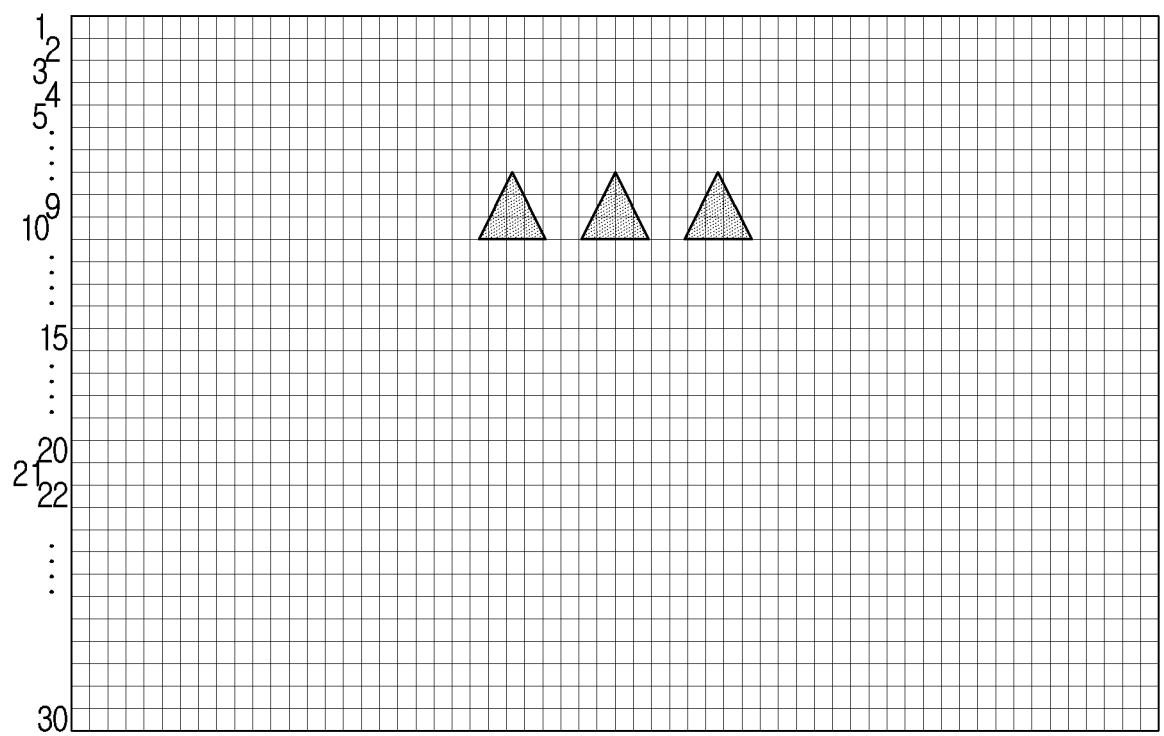
FIG. 10A is a diagram for illustrating reflective light in a triangle pattern according to an embodiment.
Figure 10B:
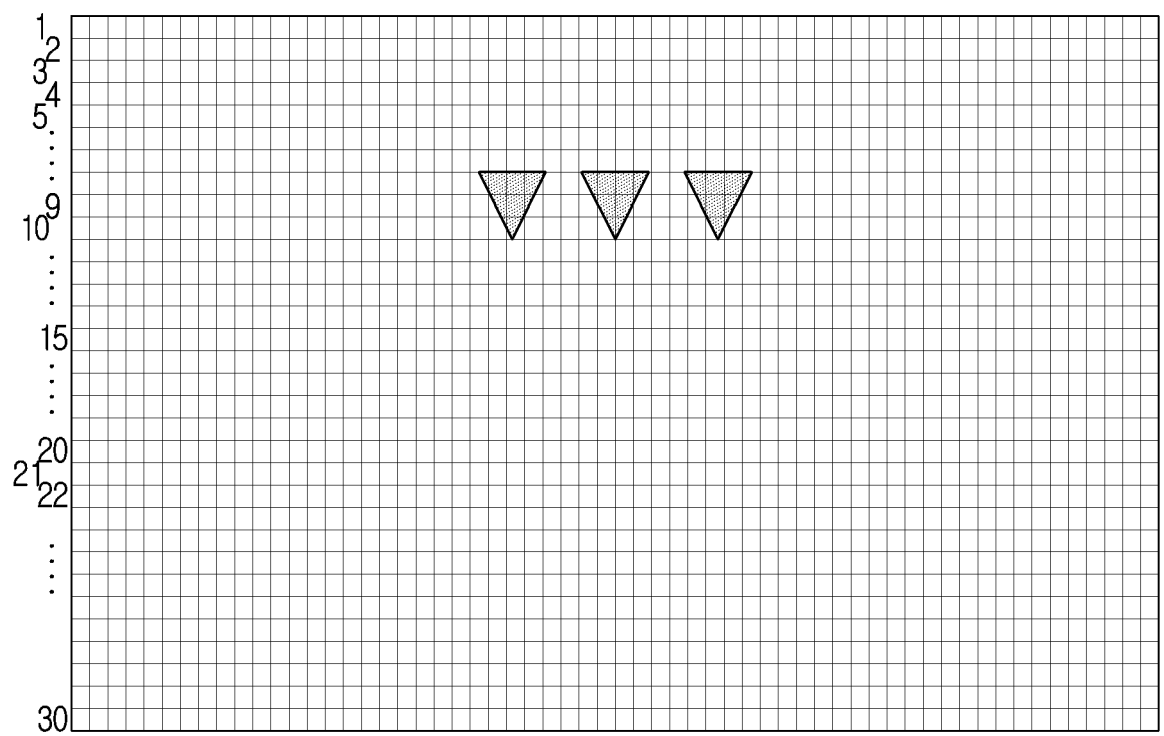
FIG. 10B is a diagram for illustrating reflective light in an inverted triangle pattern according to an embodiment.

Then, the processor 920 may identify the pattern of the reflective light based on the shape formed by the pixels that received the reflective light. Specifically, the processor 920 may identify the locations of the pixels that received the reflective light in the rows and the columns, and connect the pixels in each location and identify the shape that the pixels that received the reflective light constitute, and identify the shape as the pattern of the reflective light. As an example, as illustrated in FIG. 10A, in case the shape of the pixels that received the reflective light is a triangle, the processor 920 may identify the pattern of the reflective light as a triangle pattern, and as illustrated in FIG. 10B, in case the shape of the pixels that received the reflective light is an inverse triangle, the processor 920 may identify the pattern of the reflective light as an inverse triangle pattern.

This is merely an example, and the processor 920 may identify the pattern of reflective light through various methods. Specifically, the plurality of pixels included in the sensor 912 may output electronic signals in different sizes according to the degree of receiving light. According to an embodiment, the plurality of pixels included in the sensor 912 may include photodiodes for converting light energy into an electronic signal. Then, the processor 920 may generate an image based on electronic signals output by the sensor 912, and apply an object detection algorithm (e.g., an edge detection algorithm, etc.) to the generated image, and identify the pattern of the reflective light included in the image.

The processor 920 may identify whether the reflective light is light reflected by an object or light reflected on an object and then reflected again by another object based on the specific pattern that the radiated light has and the pattern of the reflective light.

Specifically, in a case the pattern of the reflective light corresponds to the specific pattern of the light radiated by the light source 911, the processor 920 may identify the reflective light as light reflected by an object. Meanwhile, in case the pattern of the reflective light is a pattern in symmetry with the specific pattern of the light radiated by the light source 911, the processor 920 may identify the reflective light as reflective light reflected on an object and then reflected again by another surface (i.e., the floor surface).

Here, the meaning of the feature that the pattern of the reflective light corresponds to the pattern of the light radiated by the light source 911 includes not only a case wherein the pattern of the reflective light is the same as the pattern of the light radiated by the light source 911, but also a case wherein the pattern of the reflective light coincides with the pattern of the light radiated by the light source 911 by a degree greater than or equal to a threshold value. For example, if light in an equilateral triangle pattern is radiated by the light source 911, and reflective light in an isosceles triangle pattern is received, the processor 920 may identify that the pattern of the reflective light corresponds to the pattern of the light radiated by the light source 911.

Figure 11:
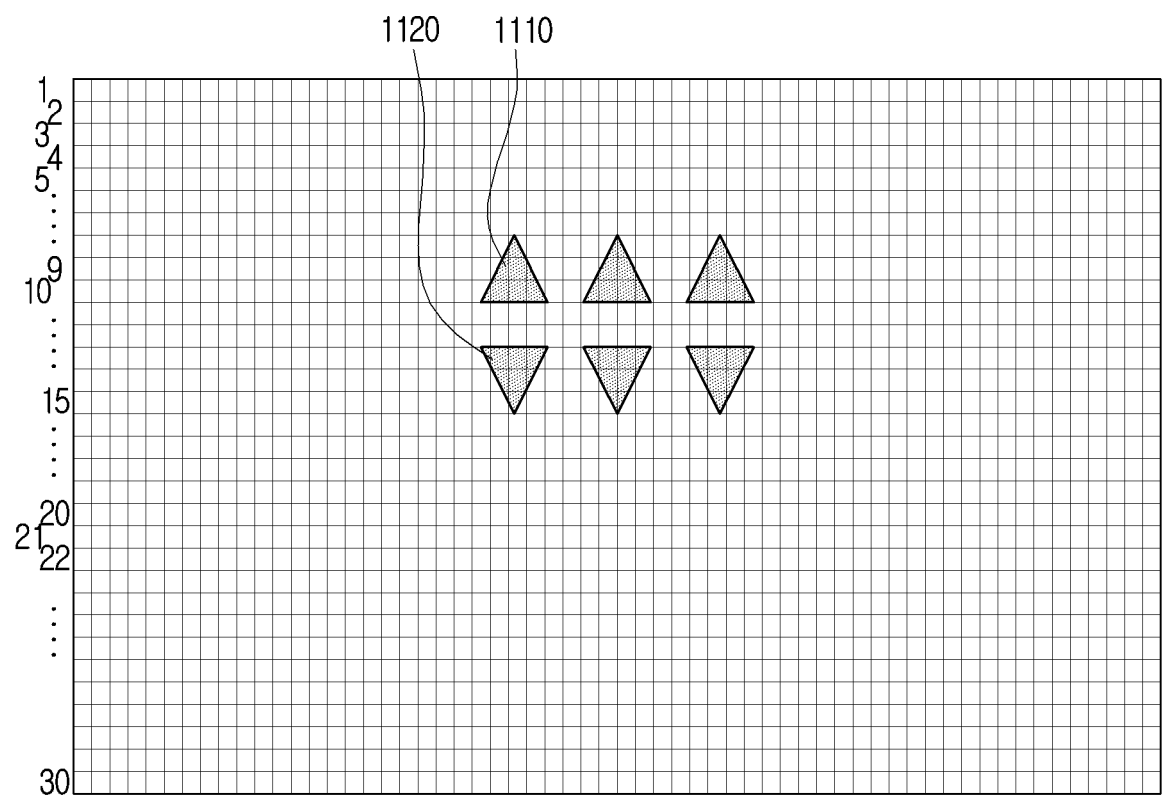
FIG. 11 is a diagram illustrating a plurality of reflective lights received at a sensor according to an embodiment.

For example, as illustrated in FIG. 11, if light having a triangle pattern is radiated by the light source 911, and a first reflective light 1110 having a triangle pattern and a second reflective light 1120 having an inverse triangle pattern are received at the sensor 912, the processor 920 may identify the first reflective light 1110 as reflective light reflected by an object since the first reflective light 1110 has the same pattern as the pattern of the light radiated by the light source 911. Meanwhile, since the second reflective light 1120 has an inverse pattern in symmetry with the pattern of the light radiated by the light source 911, the processor 920 may identify the reflective light as reflective light reflected on an object and then reflected again by the floor surface.

Thereafter, based on the row of the first reflective light 1110 reflected by an object, the processor 920 may identify the distance between the light source 911 and the object, and perform tasks such as moving and a cleaning job of the electronic apparatus 100. Meanwhile, as a method for identifying a distance between the light source 911 and an object based on the row of reflective light was described above, explanation in that regard will be omitted here.

Meanwhile, an electronic apparatus according to an embodiment may identify whether reflective light is light reflected by an object or light reflected by an object and then reflected again by the floor surface in consideration of both the degree that a receiving location of the reflective light is changed according to moving of the electronic apparatus and the pattern of the reflective light.

For example, in case a difference between a moving distance of the electronic apparatus identified through a second sensor (e.g., an acceleration sensor, a LIDAR sensor, etc.) and a moving distance identified based on the degree that a receiving location of the reflective light is changed is smaller than or equal to a predetermined threshold value, and the pattern of the reflective light is the pattern of the light radiated by the light source 911, the electronic apparatus according to an embodiment may identify that the reflective light is reflective light reflected by an object. Meanwhile, in case a difference between a moving distance of the electronic apparatus identified through a second sensor (e.g., an acceleration sensor, a LIDAR sensor, etc.) and a moving distance identified based on the degree that a receiving location of the reflective light is changed exceeds a predetermined threshold value, or the pattern of the reflective light is a pattern in symmetry with the pattern of the light radiated by the light source 911, the electronic apparatus according to an embodiment may identify that the reflective light is reflective light reflected by an object and then reflected again by the floor surface around the object, etc.

Figure 12:
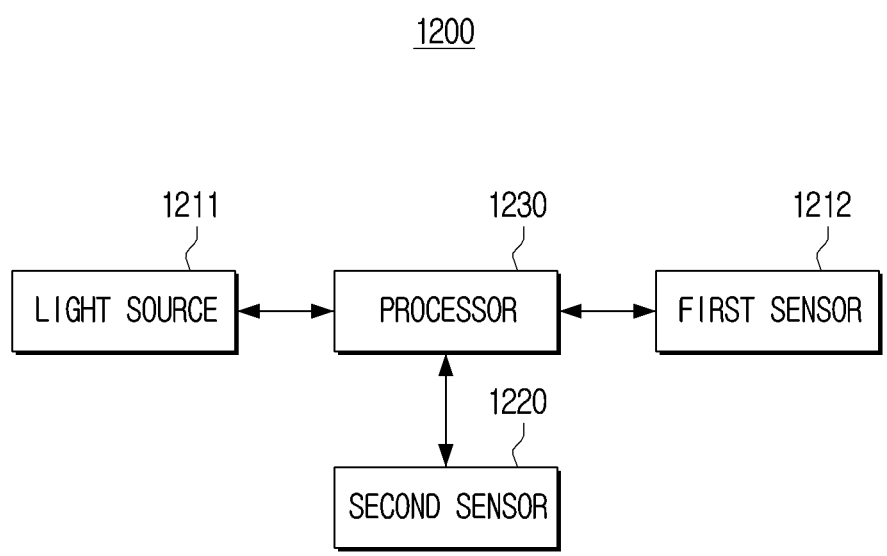
FIG. 12 is a block diagram for illustrating an electronic apparatus according to an embodiment.

FIG. 12 is a block diagram for illustrating an electronic apparatus according to an embodiment.

Referring to FIG. 12, the electronic apparatus 1200 according to an embodiment may include a light source 1211, a first sensor 1212, a second sensor 1220, and at least one processor 1230. Here, the electronic apparatus 1200 may be implemented as various electronic apparatuses such as a robot like the aforementioned electronic apparatus 100. Also, the light source 1211 may perform the function of the aforementioned light source 111, and the first sensor 1212 may perform the function of the aforementioned sensor 112.

The light source 1211 may radiate light. According to an embodiment, the light source 1211 may be implemented as various light sources that can radiate light such as a laser diode, a line laser, etc.

The first sensor 1212 may receive reflective light. Specifically, the first sensor 1212 may receive reflective light based on light radiated by the light source 1211. Here, reflective light may not only be light reflected by an object, but also light reflected on an object and then reflected again by the floor surface.

The electronic apparatus 1200 according to an embodiment may further include a memory. The memory may store an operating system (OS) for controlling the overall operations of the components of the electronic apparatus 1200 and instructions or data related to the components of the electronic apparatus 1200.

In particular, the memory may store information on distances wherein different distances are matched with each row of the plurality of pixels included in the first sensor 1212. As an example, the memory may store information on distances wherein different distances are matched with each row of pixels, as in FIG. 4. Here, the distance matched with each pixel may be a distance between the light source 621 and an object that reflected light. The embodiment illustrated in FIG. 4 is merely an example, and distances matched with each row of pixels can obviously be different from FIG. 4.

Also, the memory may store information on distances wherein a distance between the first sensor 1212 and an object that reflected light is matched with each row of pixels. In this case, the processor 1230 may identify the distance between the first sensor 1212 and the object that reflected light based on information on the rows of pixels that received reflective light and the distance between the first sensor 1212 and the object that reflected light matched with each row of pixels, and identify the distance from the light source 1211 to the object by applying a triangulation method to the distance between the first sensor 1212 and the object that reflected light, the radiation angle of the light source 1211, and the distance from the light source 1211 to the first sensor 1212. The radiation angle of the light source 1211 and the distance from the light source 1211 to the first sensor 622 may be stored in the memory in advance.

The processor 1230 may control the overall operations of the electronic apparatus 1200. According to an embodiment, the processor 1230 may include a central processing unit (CPU) or an application processor (AP). Also, the processor 1230 may be implemented as at least one general processor, a digital signal processor, an application specific integrated circuit (ASIC), a system on chip (SoC), a microcomputer (MICOM), etc.

The processor 1230 may identify reflective light reflected by an object and reflective light reflected on an object and then reflected again by the floor surface based on information detected by the second sensor 1220. Here, the second sensor 1220 may be various sensors such as an image sensor, an infrared sensor, and a stereo camera, etc. Hereinafter, explanation will be made with reference to FIGS. 13, 14, and 15.

Figure 13:
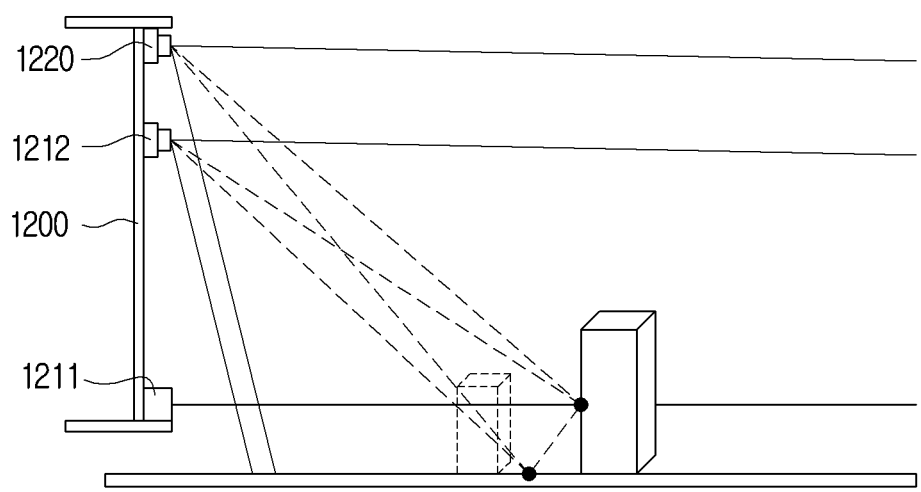
FIG. 13 is a diagram for illustrating an example wherein sensors according to an embodiment are implemented as a plurality of sensors.

FIG. 13 is a diagram for illustrating an example wherein sensors according to an embodiment are implemented as a plurality of sensors.

The electronic apparatus 1200 according to an embodiment may include a plurality of sensors. For example, referring to FIG. 13, the electronic apparatus 1200 may include a first sensor 1212 and a second sensor 1220 having different heights. Here, the second sensor 1220 may be an image sensor like the first sensor 1212.

The processor 1230 may control the light source 1211 to radiate light. In this case, the first and second sensors 1212, 1220 may receive a plurality of reflective lights based on the radiated light. As an example, the first sensor 1212 may receive a first reflective light 810 and a second reflective light 820 as in FIG. 8A, and the second sensor 1220 may receive a first reflective light 810' and a second reflective light 820' as in FIG. 8B.

The processor 1230 may identify a distance based on the locations of reflective lights received at the first and second sensors 1212, 1220. According to an embodiment, when reflective lights are received at the first and second sensors 1212, 1220, the processor 1230 may identify pixels that received the reflective lights among a plurality of pixels included in the first and second sensors 1212, 1220. As an example, the processor 1230 may identify pixels having brightness values greater than or equal to a predetermined brightness value among the plurality of pixels as pixels that received reflective lights. As explanation in this regard was made above, explanation will be omitted here.

Also, the processor 1230 may identify a distance matched with a row that received reflective light based on information on distances wherein different distances are matched with each row of a plurality of pixels. Specifically, based on information on a first distance wherein different distances are matched with each row of a plurality of pixels included in the first sensor 1212, the processor 1230 may identify a distance matched with the row of the reflective light received at the first sensor 1212. Also, based on information on a second distance wherein different distances are matched with each row of a plurality of pixels included in the second sensor 1220, the processor 1230 may identify a distance matched with the row of the reflective light received at the second sensor 1220. Meanwhile, as described above, the processor 1230 can obviously identify a distance from the electronic apparatus 1200 to an object that reflected light by using a triangulation method.

As an example, in case the first reflective light 810 was received in the row 5 of the first sensor 1212, and the second reflective light 820 was received in the row 10 as in FIG. 8A, the processor 1230 may identify a distance matched with the row of the first reflective light 810 and a distance matched with the row of the second reflective light 820 based on information on the first distance. If it is identified that the distance matched with the row 5 is 7 m, and the distance matched with the row 10 is 5 m based on information on the first distance, the processor 1230 may identify that the distance matched with the row of the first reflective light 810 is 7 m, and the distance matched with the row of the second reflective light 820 is 5 m.

In a similar manner, in case the first reflective light 810 was received in the row 15 of the second sensor 1220, and the second reflective light 820 was received in the row 22 as in FIG. 8B, the processor 1230 may identify a distance matched with the row of the first reflective light 810 and a distance matched with the row of the second reflective light 820 based on information on the second distance. If it is identified that the distance matched with the row 15 is 7 m, and the distance matched with the row 22 is 4 m based on information on the second distance, the processor 1230 may identify that the distance matched with the row of the first reflective light 810 is 7 m, and the distance matched with the row of the second reflective light 820 is 4 m.

Then, the processor 1230 may identify whether reflective light is light reflected by an object or light reflected by an object and then reflected again by the floor surface based on a difference between the distance identified based on the reflective light received at the first sensor 1212 and the distance identified based on the reflective light received at the second sensor 1220.

Specifically, if a difference between the distance identified based on the reflective light received at the first sensor 1212 and the distance identified based on the reflective light received at the second sensor 1220 is smaller than or equal to a predetermined threshold value, the processor 1230 may identify that the reflective light is light reflected by an object. Meanwhile, if a difference between the distance identified based on the reflective light received at the first sensor 1212 and the distance identified based on the reflective light received at the second sensor 1220 exceeds a predetermined threshold value, the processor 1230 may identify that the reflective light is light reflected on an object and then reflected again by the floor surface. Here, a threshold value may be set as 0.1 m, but is not necessarily limited thereto.

For example, as in the aforementioned embodiment, in case a difference between the distance identified based on the first reflective light 810 received at the first sensor 1212 and the distance identified based on the first reflective light 810 received at the second sensor 1220 is 0 which is smaller than or equal to a predetermined threshold value, the processor 1230 may identify the first reflective light 810 as light reflected by an object. Meanwhile, in case a difference between the distance identified based on the second reflective light 820 received at the first sensor 1212 and the distance identified based on the second reflective light 820 received at the second sensor 1220 is 1 m which exceeds a predetermined threshold value, the processor 1230 may identify the second reflective light 820 as light reflected on an object and then reflected again by the floor surface.

Meanwhile, in FIG. 13, two sensors were illustrated, but this is merely an example, and the number of image sensors is not limited thereto. Also, the locations of image sensors may not only be an upper side and a lower side, but also a left side and a right side.

Figure 14:
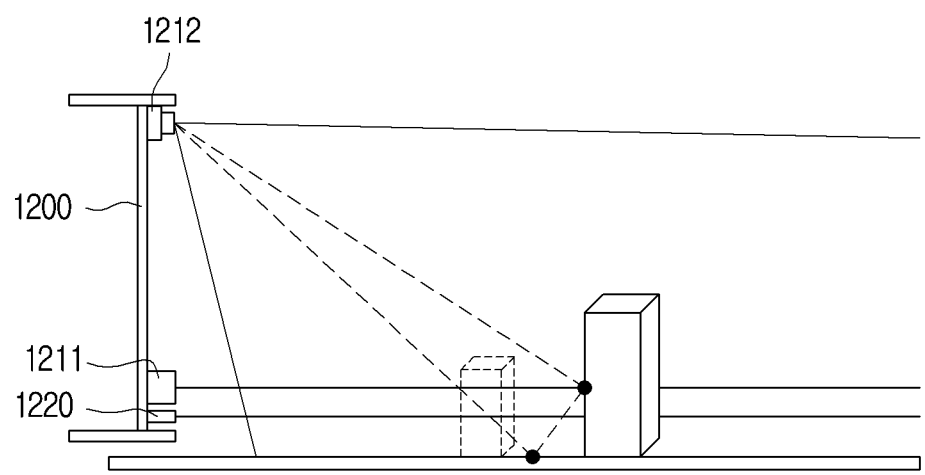
FIG. 14 is a diagram for illustrating an example wherein light that was reflected on an object and then reflected again by another surface (i.e., a floor surface) is identified by using an infrared sensor according to an embodiment.

FIG. 14 is a diagram for illustrating an example wherein light that was reflected on an object and then reflected again by a floor surface is identified by using an infrared sensor according to an embodiment.

Referring to FIG. 14, the second sensor 1220 according to an embodiment may be an infrared sensor.

The processor 1230 may control the light emitting part of the second sensor 1220 to radiate an infrared ray. As an example, if a user command for turning on the power of the electronic apparatus 1200 or a user command for moving the electronic apparatus 1200 is received, the processor 1230 may control the light emitting part of the second sensor 1220 to radiate an infrared ray. However, the disclosure is not limited thereto, and in case a plurality of reflective lights are received at pixels in different rows of the same column among a plurality of pixels included in the first sensor 1212, the processor 1230 may control the light emitting part of the second sensor 1220 to radiate an infrared ray.

According to an embodiment, when the infrared ray radiated by the second sensor 1220 is received at the light receiving part of the second sensor 1220, the processor 1230 may detect a distance between the electronic apparatus 1200 and an object based on the amount of the infrared ray received at the light receiving part.

Further, the processor 1230 may identify a distance matched with the row of the reflective light based on the location of the reflective light received at the first sensor 1212, as described above.

According to an embodiment, if the difference between the distance identified based on the row of the reflective light received at the first sensor 1212 and the distance between the electronic apparatus 1200 and an object detected based on the second sensor 1220 is smaller than or equal to a predetermined threshold value, the processor 1230 may identify the reflective light as light reflected by the object. Meanwhile, if the difference between the distance identified based on the row of the reflective light received at the first sensor 1212 and the distance between the electronic apparatus 1200 and an object detected based on the second sensor 1220 exceeds a predetermined threshold value, the processor 1230 may identify the reflective light as light reflected on the object and then reflected again by the floor surface.

For example, if a distance identified based on the row of the reflective light received at the first sensor 1212 and a distance to an object detected based on the second sensor 1220 are the same, the processor 1230 may identify the reflective light as light reflected by the object. Meanwhile, if a distance identified based on the row of the reflective light received at the first sensor 1212 and a distance to an object detected based on the second sensor 1220 are different, the processor 1230 may identify the reflective light as light reflected on the object and then reflected again by the floor surface Meanwhile, here, explanation was made by suggesting an infrared sensor as an example, but this is merely an example, and the second sensor 1220 for detecting a distance to an object may be implemented as various sensors such as an ultrasonic sensor, a LIDAR sensor, etc.

Figure 15:
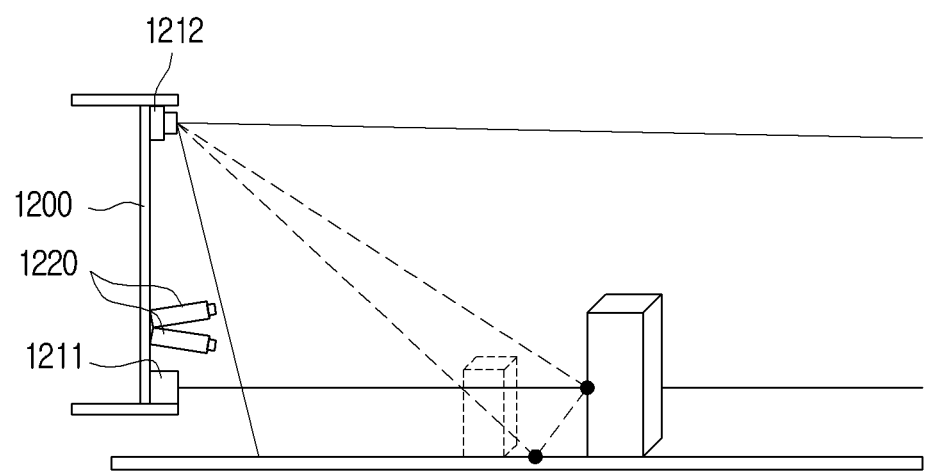
FIG. 15 is a diagram for illustrating an example wherein reflective light by the floor surface is identified by using a stereo camera according to an embodiment.

FIG. 15 is a diagram for illustrating an example wherein reflective light by a floor surface is identified by using a stereo camera according to an embodiment.

Referring to FIG. 15, the second sensor 1220 according to an embodiment may be a stereo camera. Here, a stereo camera may include a first camera and a second camera.

The processor 1230 may control the second sensor 1220 to acquire images on the left and the right sides. As an example, if a user command for turning on the power of the electronic apparatus 1200 or a user command for moving the electronic apparatus 1200 is received, the processor 1230 may control the second sensor 1220 to acquire images on the left and right sides. However, the disclosure is not limited thereto, and in case a plurality of reflective lights are received at pixels in different rows of the same column among the plurality of pixels included in the first sensor 1212, the processor 1230 may control the second sensor 1220 to acquire images on the left and right sides.

Then, the processor 1230 may acquire a three-dimensional spatial coordinate by using the acquired images on the left and right sides, and detect a distance between the electronic apparatus 1200 and an object based on the three-dimensional spatial coordinate.

Also, if the difference between the distance identified based on the row of the reflective light received at the first sensor 1212 and the distance to an object detected based on the second sensor 1220 is smaller than or equal to a predetermined threshold value, the processor 1230 may identify the reflective light as reflective light reflected by the object. Meanwhile, if the difference between the distance identified based on the row of the reflective light received at the first sensor 1212 and the distance to an object detected based on the second sensor 1220 exceeds a predetermined threshold value, the processor 1230 may identify the reflective light as reflective light reflected on the object and then reflected again by the floor surface.

For example, if the distance identified based on the row of the reflective light received at the first sensor 1212 and the distance to an object detected based on the second sensor 1220 are the same, the processor 1230 may identify the reflective light as reflective light reflected by the object. Meanwhile, if the distance identified based on the row of the reflective light received at the first sensor 1212 and the distance to an object detected based on the second sensor 1220 are different, the processor 1230 may identify the reflective light as reflective light reflected on the object and then reflected again by the floor surface.

Meanwhile, here, the second sensor 1220 was described as a stereo camera, but this is merely an example, and the second sensor 1220 may be implemented as various cameras that can detect a distance to an object. As an example, the second sensor 1220 may be implemented as a depth camera (or a 3D camera).

Figure 16A:
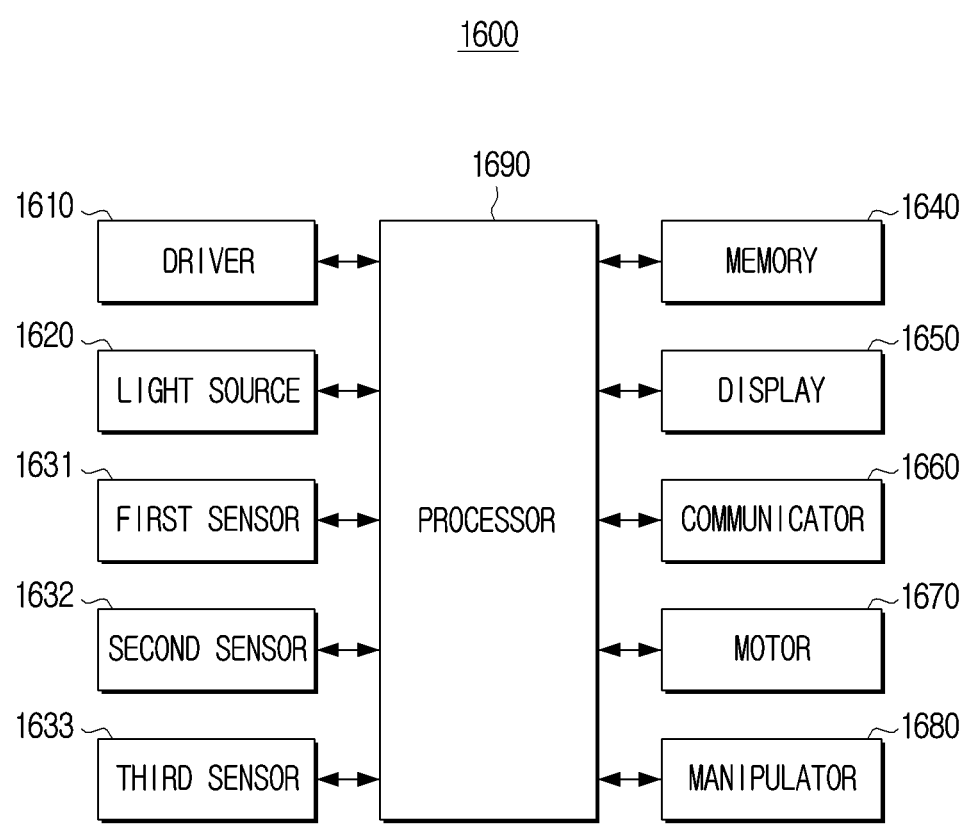
FIG. 16A is a detailed block diagram for illustrating an electronic apparatus according to an embodiment.

FIG. 16A is a detailed block diagram for illustrating an electronic apparatus according to an embodiment.

Referring to FIG. 16A, the electronic apparatus 1600 according to an embodiment may include a driver 1610, a light source 1620, a first sensor 1631, a second sensor 1632, a third sensor 1633, a memory 1640, a display 1650, a communicator 1660, a motor 1670, a manipulator 1680, and a processor 1690. This is merely an example, and the electronic apparatus 1600 may be implemented while some components among the plurality of aforementioned components are excluded, or implemented while further including components other than the plurality of aforementioned components.

Hereinafter, parts overlapping with the parts of the aforementioned description will be omitted or will be explained while being abridged.

The driver 1610 may move the electronic apparatus 1600. Here, the driver 1610 is a component including an operator and a motor connected to the operator, and the operator of the driver 1610 may be implemented as a wheel or a leg of a robot, etc., and the motor of the driver 1610 may move the electronic apparatus 1600 by controlling the operator according to control of the processor 1690.

The light source 1620 may radiate light. Here, light may be planar light in the form of a fan, but is not necessarily limited thereto, and light may be radiated in various forms. For example, the light source 1620 may radiate light in which upper and lower sides are asymmetrical, a pattern of which left and right sides are asymmetrical, and a pattern of which upper, lower, left, and right sides are asymmetrical.

After light is radiated by the light source 1620, the first sensor 1631 may receive a plurality of reflective lights. Here, a plurality of reflective lights may include first reflective light reflected by an object and second reflective light reflected on an object and then reflected again by the floor surface.

Then, the plurality of pixels included in the first sensor 1631 may output electronic signals in different sizes according to the degree of receiving reflective light. According to an embodiment, the plurality of pixels included in the first sensor 1631 may include photodiodes for converting light energy into an electronic signal.

The memory 1640 may store an operating system (OS) for controlling the overall operations of the components of the electronic apparatus 1600 and instructions or data related to the components of the electronic apparatus 1600.

Accordingly, the processor 1690 may control a plurality of hardware or software components of the electronic apparatus 1600 by using various instructions or data stored in the memory 1640, and load instructions or data received from at least one of other components in a volatile memory and process them, and store various data in a non-volatile memory.

In particular, the memory 1640 may store information on distances wherein different distances are matched for each row of a plurality of pixels included in the first sensor 1631. Accordingly, when reflective light is received at the first sensor 1631, the processor 1690 may identify a distance between the electronic apparatus 1600 and an object based on the row of pixels that received the reflective light among the plurality of pixels included in the first sensor 1631.

Also, the memory 1640 may store information on thicknesses of reflective lights distinguished for each distance.

Then, based on information on thicknesses of reflective lights, the electronic apparatus 1600 may identify light reflected by an object and reflective light reflected on an object and then reflected again by the floor surface around the object, etc. among a plurality of reflective lights reflected on the first sensor 1631.

Specifically, when reflective light is received at the first sensor 1631, the processor 1690 of the electronic apparatus 1600 may identify pixels having brightness greater than or equal to a predetermined brightness value among the plurality of pixels included in the first sensor 1631 as pixels that received the reflective light. Then, the processor 1690 may identify the thickness of the reflective light based on the vertical interval of each pixel included in the first sensor 1631. As an example, in case the vertical interval of each pixel is 1 mm, if reflective light is received in one row, the processor 1690 may identify the thickness of the reflective light as 1 mm. Alternatively, if reflective light is received at pixels in different rows of the same column, the processor 1690 may identify the value of multiplying the number of rows that received the reflective light with the vertical length of each pixel as the thickness of the reflective light. As an example, if reflective light is received in different rows 1 and 2 on the same column, and the vertical interval of each pixel is 1 mm, the processor 1690 may identify the thickness of the reflective light as 2 mm. Then, based on information on thicknesses of reflective lights, the processor 1690 may identify a distance between the electronic apparatus 1600 and an object. For example, in case the thickness of reflective light is identified as 0.2 mm, and a distance matched with the thickness of the reflective light 0.2 mm is identified as 2 m based on information on thicknesses of reflective lights, the processor 1690 may identify the distance between the electronic apparatus 1600 and an object as 2 m.

Then, based on information on distances wherein different distances are matched with each row of a plurality of pixels, the processor 1690 may identify a distance matched with the row of the reflective light received at the first sensor 1631. Further, based on the distance to the object identified based on information on thicknesses of reflective lights and the distance identified based on the receiving location of the reflective light, the processor 1690 may identify reflective light reflected by an object and reflective light reflected on an object and then reflected again by the floor surface around the object, etc. among the plurality of reflective lights received at the first sensor 1631.

Specifically, if a difference between a distance to an object identified based on information on thicknesses of reflective lights and a distance identified based on the receiving location of reflective light is smaller than or equal to a predetermined threshold value, the processor 1690 may identify that the reflective light is light reflected by an object. Meanwhile, if a difference between a distance to an object identified based on information on thicknesses of reflective lights and a distance identified based on the receiving location of reflective light exceeds a predetermined threshold value, the processor 1690 may identify that the reflective light is light reflected on an object and then reflected again by the floor surface around the object, etc.

Here, a predetermined threshold value may be 0.1 m, but this is merely an example, and a threshold value may be set or changed in various ways.

The feature described above is based on the fact that the thickness of reflective light received at the first sensor 1631 varies for each distance to an object, and accordingly, the disclosure may identify whether reflective light is reflective light reflected by an object or reflective light reflected on an object and then reflected again by another object.

The display 1650 may display various screens. For example, the display 1650 may display information on an object around the electronic apparatus 1600 and the distance to the object.

Such a display 1650 may be implemented as displays in various forms such as a liquid crystal display (LCD), a plasma display panel (PDP), and the like. In the display 1650, a driving circuit that can be implemented as forms such as an a-si TFT, a low temperature polysilicon (LTPS) TFT, an organic TFT (OTFT), etc., a backlight unit, and the like may be included together. The display 1650 may be combined with a touch detecting part and implemented as a touch screen.

The communicator 1660 is a component performing communication with an external apparatus. For example, the communicator 1660 may perform communication with various external apparatuses through a wireless communication method such as Bluetooth (BT), Bluetooth Low Energy (BLE), Wireless Fidelity (WI-FI), Zigbee, and the like or an infrared (IR) communication method. The communicator 1660 may not only be installed on the processor 1690, but may also be included in the electronic apparatus 1600 as a component separate from the processor 1690.

According to an embodiment, the communicator 1660 may receive information on distances wherein different distances are matched with each row of the plurality of pixels included in the first sensor 1631 or information on thicknesses of reflective lights distinguished for each distance from an external apparatus.

The processor 1690 controls the overall operations of the electronic apparatus 1600.

As an example, the processor 1690 may control the light source 1620 to radiate light, and based on a difference between a distance to an object identified based on information on thicknesses of reflective lights and a distance identified based on the row of reflective light received at the first sensor 1631, the processor 1690 may identify whether reflective light is reflective light reflected by an object or reflective light reflected on an object and then reflected again by another object such as a floor surface or a wall surface, etc.

Alternatively, the processor 1690 may control the light source 1620 to radiate light having a specific pattern, and based on the pattern of reflective light, the processor 1690 may identify whether reflective light is reflective light reflected by an object or reflective light reflected on an object and then reflected again by another object such as a floor surface or a wall surface, etc.

Alternatively, the processor 1690 may control the light source 1620 to radiate light, and based on a moving distance of the electronic apparatus 1600 identified based on the degree that the receiving location of reflective light is changed according to moving of the electronic apparatus 1600 and a moving distance of the electronic apparatus 1600 identified through the second sensor 1632, the processor 1690 may identify whether reflective light is reflective light reflected by an object or reflective light reflected on an object and then reflected again by another object such as a floor surface or a wall surface, etc.

Alternatively, based on a distance identified based on reflective light received at the first sensor 1631 and a distance to an object detected by the third sensor 1632, the processor 1690 may identify reflective light reflected by an object and reflective light reflected on an object and then reflected again by another object such as a floor surface or a wall surface, etc. among a plurality of reflective lights. Here, the third sensor 1632 may be various sensors that can detect a distance to an object such as an image sensor, an infrared sensor, and a stereo camera, etc.

The processor 1690 may identify whether reflective light is reflective light reflected by an object or reflective light reflected on an object and then reflected again by another object such as a floor surface or a wall surface, etc. based on combinations of the aforementioned various embodiments. For example, in consideration of all of the pattern of reflective light, a moving distance of the electronic apparatus 1600 identified based on the degree that the receiving location of reflective light is changed according to moving of the electronic apparatus 1600, and a moving distance of the electronic apparatus 1600 identified through the second sensor 1632, the processor 1690 may identify whether reflective light is reflective light reflected by an object or reflective light reflected on an object and then reflected again by another object such as a floor surface or a wall surface, etc. Alternatively, in consideration of all of a moving distance of the electronic apparatus 1600 identified based on the degree that the receiving location of reflective light is changed according to moving of the electronic apparatus 1600, a moving distance of the electronic apparatus 1600 identified through the second sensor 1632, and a distance to an object detected by the third sensor 1633, the processor 1690 may identify whether reflective light is reflective light reflected by an object or reflective light reflected on an object and then reflected again by another object such as a floor surface or a wall surface, etc. Alternatively, in consideration of all of the pattern of reflective light, a moving distance of the electronic apparatus 1600 identified based on the degree that the receiving location of reflective light is changed according to moving of the electronic apparatus 1600, and a distance to an object detected by the third sensor 1633, the processor 1690 may identify whether reflective light is reflective light reflected by an object or reflective light reflected on an object and then reflected again by another object such as a floor surface or a wall surface, etc.

The electronic apparatus 1600 according to an embodiment may further include various components other than the aforementioned components.

As an example, the electronic apparatus 1600 may further include an inputter that can receive a user input. Here, the inputter may be implemented as a button or a touch screen, and may receive various user commands such as a user command for moving the electronic apparatus 1600.

Also, the electronic apparatus 1600 may further include a speaker that can output various kinds of audio data. According to an embodiment, the speaker may output a sound in case the driving of the electronic apparatus 1600 starts or a driving direction is changed, etc.

In addition, the electronic apparatus 1600 may further include a microphone that can receive a user voice. Here, a user voice may be a user voice for execution of a task of the electronic apparatus 1600, etc.

Figure 16B:
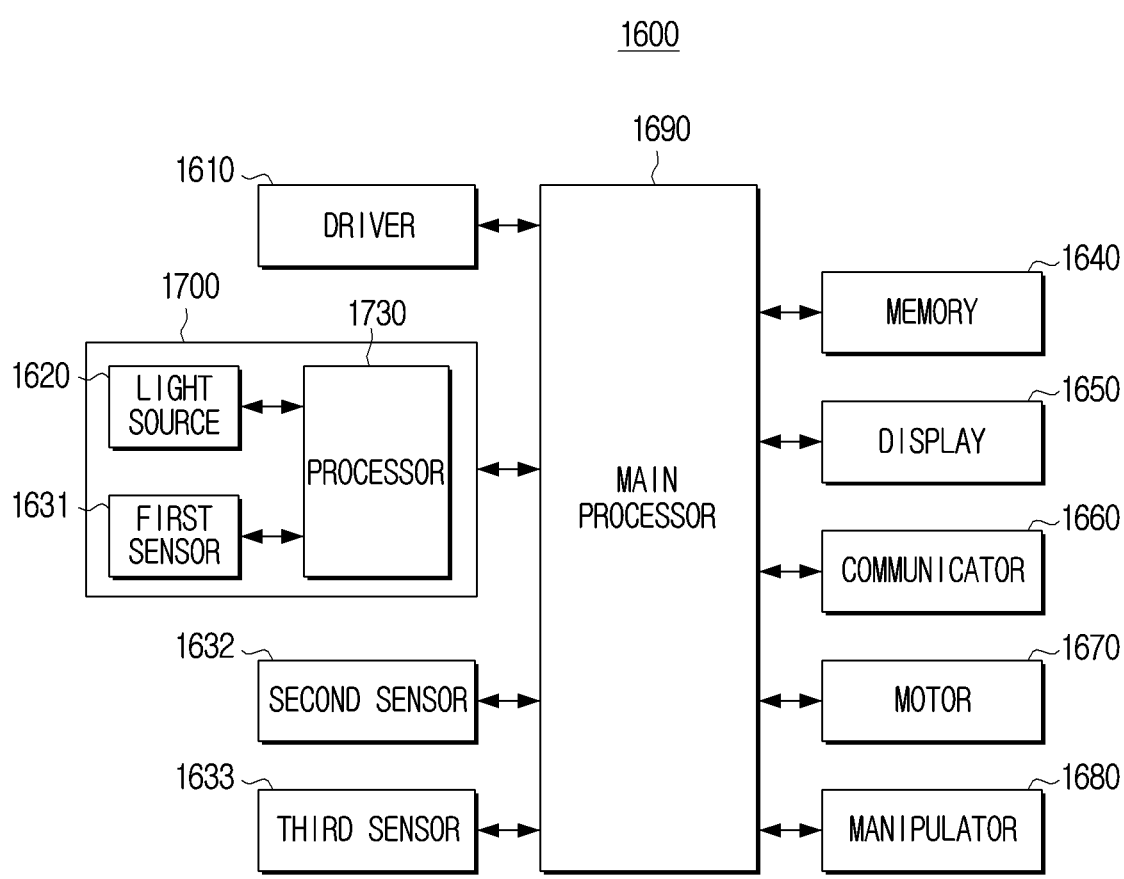
FIG. 16B is a detailed block diagram for illustrating an electronic apparatus including a sensor module according to an embodiment.

Meanwhile, in FIG. 16A, the light source 1620 and the first sensor 1631 were described as separate components, but the light source 1620 and the first sensor 1631 may be constituted as one sensor module 1700. As an example, referring to FIG. 16B, the sensor module 1700 includes a light source 1620, a sensor 1631, and a processor 1730. Here, the processor 1730 may control the light source 1620 and the first sensor 1631 based on a control signal received from the processor 1690 operating as a main processor.

As an example, the processor 1730 may control the light source 1620 to radiate light according to control of the main processor 1690, and when reflective light is received at the first sensor 1631, the processor 1730 may identify a distance corresponding to the reflective light (or, a distance from the light source 1620 to an object) based on the row of pixels that received the reflective light among a plurality of pixels. Then, the processor 1730 may transmit information on the distance corresponding to the reflective light to the main processor 1690. The processor 1730 may be implemented as a microprocessor computer (MICOM) or a field programmable gate array (FPGA), etc.

According to the various embodiments as described above, an electronic apparatus that is capable of distinguishing reflective light reflected by an object and reflective light that was reflected on an object and then reflected again by another object (e.g., a floor surface or a wall surface, etc.), and a control method thereof can be provided.

Methods according to the aforementioned various embodiments may be implemented in the form of software or an application that can be installed on a conventional electronic apparatus.

Also, methods according to the aforementioned various embodiments may be implemented just by software upgrade, or hardware upgrade of a conventional electronic apparatus.

In addition, the aforementioned various embodiments may be implemented through an embedded server installed on an electronic apparatus, or an external server of an electronic apparatus.

According to embodiments, a non-transitory computer readable medium storing a program that sequentially performs the control method of an electronic apparatus according to the disclosure can be provided.

According to embodiments, a non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disk, a blue-ray disk, a USB, a memory card, a ROM and the like.

Also, while embodiments have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:
   a light source configured to radiate first light at a first time and second light at a second time;
   a first sensor configured to:
      receive first reflective light based on the first light radiated from the light source, and
      receive second reflective light based on the second light radiated from the light source;
   a second sensor configured to detect a moving distance of the electronic apparatus from the first time to the second time; and
   a processor configured to:
      based on the first reflective light corresponding to the light radiated by the light source being received at first pixels among a plurality of pixels included in the first sensor, identify a first distance based on locations of the first pixels in the first sensor that received the first reflective light,
      based on the second reflective light corresponding to the light radiated by the light source being received at second pixels among the plurality of pixels included in the first sensor, identify a second distance based on locations of the second pixels in the first sensor that received the second reflective light,
      obtain a difference in distance between the first distance and the second distance, and
      based on the difference in distance and the moving distance of the electronic apparatus from the first time to the second time detected by the second sensor, identify whether the first reflective light and the second reflective light are reflected by an object or reflected on the object and subsequently reflected by another surface.

2. The electronic apparatus of claim 1, further comprising:
   a memory configured to store distance information on distances which are respectively associated with rows of the plurality of pixels,
   wherein the processor is further configured to:
   based on information on a row of the first pixels that received the first reflective light, identify the first distance, and
   based on information on a row of the second pixels that received the second reflective light, identify the second distance.

3. The electronic apparatus of claim 1, wherein the processor is further configured to:
   based on the difference in distance being smaller than or equal to a predetermined threshold value, identify the first reflective light and the second reflective light as being reflected by the object, and
   based on the difference in distance exceeding the predetermined threshold value, identify the first reflective light and the second reflective light as being reflected again by the another surface.

4. The electronic apparatus of claim 1, wherein the processor is further configured to identify pixels, among the plurality of pixels included in the first sensor, having brightness values greater than or equal to a predetermined brightness value as pixels that received the first reflective light and the second reflective light.

5. The electronic apparatus of claim 1, wherein the plurality of pixels included in the first sensor output electronic signals having different magnitudes according to an amount of the first reflective light and the second reflective light on each of the plurality of pixels, and
   wherein the processor is further configured to identify pixels, among the plurality of pixels included in the first sensor, output electronic signals greater than or equal to a predetermined magnitude as pixels that received the first reflective light and the second reflective light.

6. The electronic apparatus of claim 1, wherein the processor is further configured to, based on the first reflective light and the second reflective light being received at pixels in different rows of a same column among the plurality of pixels included in the first sensor, control the second sensor to detect the moving distance of the electronic apparatus.

7. A control method of an electronic apparatus, the control method comprising:
   receiving information on first reflective light based on first light radiated from a light source;
   receiving second reflective light based on second light radiated from the light source, the first light being radiated by the light source at a first time and the second light being radiated by the light source at a second time;
   based on the first reflective light corresponding to the light radiated by the light source being received at first pixels among a plurality of pixels included in a first sensor, identifying a first distance based on rows of the first pixels in the first sensor that received the first reflective light;
   based on the second reflective light corresponding to the light radiated by the light source being received at second pixels among the plurality of pixels included in the first sensor, identifying a second distance based on rows of the second pixels in the first sensor that received the second reflective light;

obtaining a difference in distance between the first distance and the second distance; and based on the difference in distance and a moving distance of the electronic apparatus from the first time to the second time detected by a second sensor, identifying whether the first reflective light and the second reflective light are reflected by an object or reflected on the object and subsequently reflected by another surface.

8. The control method of an electronic apparatus of claim 7, further comprising storing distance information on distances which are respectively associated with rows of the plurality of pixels, wherein the identifying the first distance comprises, based on information on a row of the first pixels that received the first reflective light, identifying the first distance, and the identifying the second distance comprises, based on information on a row of the second pixels that received the second reflective light, identifying the second distance.

9. The control method of an electronic apparatus of claim 7, wherein the identifying comprises:

based on the difference in distance being smaller than or equal to a predetermined threshold value, identifying the first reflective light and the second reflective light as being reflected by the object, and based on the difference in distance exceeding the predetermined threshold value, identifying the first reflective light and the second reflective light as being reflected again by the another surface.

10. The control method of an electronic apparatus of claim 7, further comprising identifying pixels, among the plurality of pixels included in the first sensor, having brightness values greater than or equal to a predetermined brightness value as pixels that received the first reflective light and the second reflective light.

11. The control method of an electronic apparatus of claim 7, further comprising identifying pixels, among the plurality of pixels included in the first sensor, outputting electronic signals greater than or equal to a predetermined magnitude as pixels that received the first reflective light and the second reflective light.

12. The control method of an electronic apparatus of claim 7, further comprising, based on the first reflective light and the second reflective light being received at pixels in different rows of a same column among the plurality of pixels included in the first sensor, controlling the second sensor to detect the moving distance of the electronic apparatus.

* * * * *